US012748924B2

(12) United States Patent
Pieraccini et al.

(10) Patent No.: US 12,748,924 B2
(45) Date of Patent: Sep. 29, 2026

(54) CONTROLLING A STYLE OF LARGE LANGUAGE MODEL(S) DURING ONGOING DIALOG(S) THROUGH UTILIZATION OF NATURAL LANGUAGE BASED RESPONSE STYLE TAG(S)

(71) Applicant: GOOGLE LLC, Mountain View, CA (US)

(72) Inventors: Roberto Pieraccini, New York, NY (US); Wangqing Yuan, Wilmington, MA (US); Martin Baeuml, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 491 days.

(21) Appl. No.: 18/120,216

(22) Filed: Mar. 10, 2023

(65) Prior Publication Data

US 2024/0304184 A1 Sep. 12, 2024

(51) Int. Cl.

| | |
|---|---|
| ***G06F 40/35*** | (2020.01) |
| ***G10L 15/06*** | (2013.01) |
| ***G10L 15/18*** | (2013.01) |
| ***G10L 15/197*** | (2013.01) |
| ***G10L 15/22*** | (2006.01) |
| ***G10L 15/30*** | (2013.01) |

(52) U.S. Cl.

CPC ............ *G06F 40/35* (2020.01); *G10L 15/063* (2013.01); *G10L 15/1807* (2013.01); *G10L 15/1815* (2013.01); *G10L 15/197* (2013.01); *G10L 15/22* (2013.01); *G10L 15/30* (2013.01)

(58) Field of Classification Search

None

See application file for complete search history.

(56) References Cited

U.S. PATENT DOCUMENTS

| | | | | |
|---|---|---|---|---|
| 2019/0354594 | A1 | 11/2019 | Foster | |
| 2020/0394366 | A1* | 12/2020 | Miller | G06F 40/35 |
| 2020/0395008 | A1 | 12/2020 | Cohen | |

(Continued)

OTHER PUBLICATIONS

Han, S. et al., "Meet Your Favorite Character: Open-domain Chatbot Mimicking Fictional Characters with only a Few Utterances"; arXiv.org, Cornell University; arXiv:2204.10825v1; 19 pages; dated Apr. 22, 2022.

(Continued)

*Primary Examiner* — Antim G Shah

(74) *Attorney, Agent, or Firm* — Gray Ice Higdon

(57) ABSTRACT

As part of an ongoing dialog between a user and an automated assistant, processor(s) can receive a natural language (NL) based input from the user during a turn of the ongoing dialog, obtain style signal(s) for the turn, and determine, based on the style signal(s), a NL based response style that is not specified in the NL based input. Further, the processor(s) can process, using a large language model (LLM), the NL based input and a NL based response style tag for the NL based response style to generate LLM output, determine, based on the LLM output, a NL based response in the NL based response style, and cause the NL based response to be rendered. In some implementations, a LLM behavior controller is utilized to determine the NL based response style, whereas in other implementations, the LLM is fine-tuned to determine the NL based response style.

17 Claims, 9 Drawing Sheets

(56) References Cited

U.S. PATENT DOCUMENTS

| | | | | |
|---|---|---|---|---|
| 2022/0229999 | A1 | 7/2022 | Vig | |
| 2023/0118412 | A1* | 4/2023 | Gao | G10L 15/22 704/231 |

OTHER PUBLICATIONS

European Patent Office; International Search Report and Written Opinion issued in Application No. PCT/US2023/027145; 14 pages; dated Nov. 24, 2023.

* cited by examiner

CONTROLLING A STYLE OF LARGE LANGUAGE MODEL(S) DURING ONGOING DIALOG(S) THROUGH UTILIZATION OF NATURAL LANGUAGE BASED RESPONSE STYLE TAG(S)

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components for interpreting and responding to natural language (NL) based inputs received during a dialog session. Large language models (LLMs) are particular types of machine learning models that are trained on enormous amounts of diverse data and that can perform various natural language processing (NLP) tasks. Recent developments have integrated aspects of LLMs into this pipeline of components for interpreting and responding to the NL based inputs. Generally, a dialog session with an automated assistant that is integrated with aspects of LLMs is initiated by a user providing a NL based input, and the automated assistant can generate a response to the NL based inputs using the aforementioned pipeline of components. Notably, these LLMs enable the automated assistant to reflect certain styles in generating the response.

However, in many instances, for the automated assistant to reflect a given style in generating the response, the user needs to explicitly include an indication of the given style in providing the NL based input. For example, assume that a user that is engaged in an ongoing dialog with an automated assistant and provides NL based input of "tell me politely one way tie my shoes". In this example, "politely" reflects the given style to be utilized in generating a response. Accordingly, in responding to the user, the automated assistant can leverage these LLMs to respond to the user in a polite manner to inform the user of one way to tie their shoes based on the NL based input explicitly including the given style. Further assume that the user that is engaged in the ongoing dialog with the automated assistant provides additional NL based input of "tell me another way tie my shoes". In this example, the user does not explicitly include "politely" to reflect the given style to be utilized in generating an additional response. Accordingly, in responding to the user, the automated assistant can still leverage these LLMs, but the additional response will be generated in a style agnostic manner. Put another way, the given style typically will not persist throughout the ongoing dialog unless specified by the user at each dialog turn, thereby increasing a length of the NL based input and distracting from the natural flow of the ongoing dialog.

One approach for the automated assistant to reflect the given style in generating the response and that can, in some instances, obviate the need for the user to explicitly include the indication of the given style in providing the NL based input is to fine-tune one or more of these LLMs to specific styles. As noted above, these LLMs are trained on enormous amounts of diverse data. However, in fine-tuning these LLMs, they are further trained on less data, but that is specific to a particular task. For example, one or more of these LLMs can be further trained based on conversation or dialog data that reflects certain styles. Accordingly, when one or more of these LLMs are subsequently integrated into the aforementioned pipeline of components for interpreting and responding to the NL based inputs, the responses to the NL based inputs are more likely to reflect the certain styles of the conversation or dialog data that was utilized to fine-tune one or more of these LLMs. However, even in these instances, the responses can still be generated in a style agnostic manner or use the certain styles in an unpredictable manner when the user does not explicitly include the indication of the given style in providing the NL based input. Accordingly, there is a need in the art to better control the style of these LLMs during ongoing dialogs.

SUMMARY

Implementations described herein are directed to an automated assistant that leverages a large language model (LLM) during an ongoing dialog with a user of a client device and that can control a natural language (NL) based response style of the (LLM) throughout the ongoing dialog using various style tags. For example, as part of the ongoing dialog between the user and the automated assistant, processor(s) can receive a natural language (NL) based input from the user during a turn of the ongoing dialog between the user and the automated assistant, obtain style signal(s) for the turn of the ongoing dialog between the user and the automated assistant, and determine, based on the style signal(s) and from among a plurality of disparate NL based response styles, a given NL based response style that is not specified in the NL based input but is to be utilized in responding to the NL based input. Further, the processor(s) can process, using the LLM, the NL based input and a given NL based response style tag that is associated with the given NL based response style to generate LLM output, determine, based on the LLM output, a NL based response that is in the given NL based response style and that is responsive to the NL based input, and cause the NL based response to be rendered at the client device of the user.

Some non-limiting examples of the plurality of disparate types of NL based response styles include a dominant response style, a submissive response style, an inquisitive response style, a proactive response style, an engaging response style, a terse response style, a polite response style, and a direct response style. These NL based response styles, when utilized in controlling the LLM, can cause the automated assistant that leverages the LLM to exhibit certain behaviors that, absent techniques described herein, are difficult to control throughout an ongoing dialog without the user having to specify the given NL based response style at each turn of the dialog. For instance, the inquisitive response style can cause the automated assistant that leverages the LLM to exhibit a curiosity-driven behavior to inquire about one or more aspects of the user. Further, the engaging response style can cause the automated assistant that leverages the LLM to exhibit a mixed initiative behavior to continue driving the ongoing dialog past the given turn of the ongoing dialog and reflect more natural and fluid human-like conversations. Moreover, the proactive response style can cause the automated assistant that leverages the LLM to exhibit a proactive behavior to provide information beyond simply responding to a question or prompt provided by the user in the NL based input to reflect more natural and fluid human-like conversations. Additionally, the dominant response style, the submissive response style, the terse response style, the polite response style, and the direct response style can cause the automated assistant that leverages the LLM to exhibit a personality mirroring behavior to reflect a personality of the user that is engaged in the ongoing dialog with the automated assistant.

Further, to ensure that the NL based response reflects the given NL based response style, not only do the processor(s) process the NL based input to generate the LLM output, but the processor(s) also process the given NL based response style tag that is associated with the given NL based response style to generate the LLM output. The given NL based response style tag can encode information, that is in addition to the NL based input provided by the user, to ensure that the NL based response generated based on the LLM output reflects the given NL based response style. The information encoded in the given NL based response style tag can include, for example, one or more prompts (e.g., textual data of "in a [NL based response style]", where "[NL based response style]" is a placeholder for one or more of the plurality of disparate NL based response styles), one or more tokens (e.g., a token of "[NL based response style]", where "[NL based response style]" is a placeholder for one or more of the plurality of disparate NL based response styles), and/or any other information that is not explicitly included in the NL based input, but can be processed using the LLM to ensure that the NL based response reflects the given NL based response style.

In some implementations, the ongoing dialog is a spoken dialog and the NL based input is a spoken utterance that is captured in audio data generated by microphone(s) of the client device. In implementations where the ongoing dialog is a spoken dialog, the style signal(s) for the given turn of the ongoing dialog can include, for example, one or more prosodic properties for the spoken utterance captured in the audio data, one or more sentiments for the spoken utterance captured in the audio data, a conversation history between the user and the automated assistant, and/or any other signals that can be obtained during the spoken dialog to inform the automated assistant of an appropriate NL based response style. For example, the processor(s) can process the audio data to determine the one or more prosodic properties for the spoken utterance and/or the one or more sentiments for the spoken utterance, and the processor(s) can analyze a dialog history between the user and the automated assistant to determine the conversation history between the user and the automated assistant.

In other implementations, the ongoing dialog is a textual dialog and the NL based input is typed input that is provided at a touch-sensitive display of the client device (e.g., via a virtual keyboard) and/or an external user interface input device (e.g.) by microphone(s) of the client device (e.g., via a physical keyboard, mouse, etc.). In implementations where the ongoing dialog is a textual dialog, the style signal(s) for the given turn of the ongoing dialog can include, for example, one or more characteristics of the typed input (e.g., a typing speed of the typed input, a length of the typed input, and/or other characteristics of the typed input), one or more sentiments associated with one or more words or phrases included in the typed input, a conversation history between the user and the automated assistant, and/or any other signals that can be obtained during the textual dialog to inform the automated assistant of an appropriate NL based response style. For example, the processor(s) can process the typed input to determine the one or more characteristics of the typed input and/or the one or more sentiments associated with one or more words or phrases included in the typed input, and the processor(s) can analyze a dialog history between the user and the automated assistant to determine the conversation history between the user and the automated assistant.

In some implementations, the processor(s) can train a LLM behavior controller based on a plurality of training instances. Each of the plurality of training instances can include a given dialog turn as corresponding training instance input and a given NL based response style as corresponding training instance output. Accordingly, in training the LLM behavior controller, it can effectively learn a mapping between the style signal(s) of the given dialog turn of the corresponding training instance inputs and the given NL based response styles of the corresponding training instance outputs. Further, the processor(s) can subsequently utilize the LLM behavior controller to determine the given NL based response style based on the style signal(s) obtained for the given turn of the ongoing dialog. Notably, the LLM behavior controller is additional machinery that is separate from the LLM.

However, in other implementations, the processor(s) can fine-tune the LLM based on a plurality of training instances. Similarly, each of the plurality of training instances can include a given dialog turn as corresponding training instance input and a given NL based response style as corresponding training instance output, and the LLM can be fine-tuned using any known fine-tuning technique with a fine-tuning task of determining the given NL based response style of the corresponding training instance outputs based on the style signal(s) of the given dialog turn of the corresponding training instance inputs. Notably, in these implementations, the LLM behavior controller can be omitted, but several passes across the LLM may be needed at inference, such as a first pass of the NL based input across the LLM to determine the given NL based response style, and a second pass to generate the LLM output based on the NL based input and the given style tag associated with the given NL based response style. Put another way, the first pass can be utilized to prime the LLM based on the determined given NL based response style, and the second pass can be utilized to generate the LLM output.

In various implementations, the processor(s) can obtain contextual signal(s) for the given dialog turn of the ongoing dialog. In these implementations, the processor(s) can process, using the LLM, and in addition to the NL based input and the given NL based response style tag that is associated with the given NL based response style, the contextual signal(s) to generate the LLM output. In some versions of these implementations, the contextual signal(s) are mutually exclusive with respect to the style signal(s), such that there is no overlap between the contextual signal(s) and the style signal(s). However, in other versions of these implementations, the contextual signal(s) are not mutually exclusive with respect to the style signal(s), such that there is at least some overlap between the contextual signal(s) and the style signal(s).

The contextual signal(s) can include, for example, contextual signal(s) associated with the user of the client device, such as user profile data that characterizes a user profile of the user of the client device, user attribute data that characterizes one or more attributes of the user of the client device, user preference data that characterizes one or more preferences of a user of the client device, user interaction data that characterizes recent user interactions with the client device, and/or other contextual signal(s) associated with the user of the client device. Further, the contextual signal(s) can include, for example, contextual signal(s) associated with the client device itself, such as location data that characterizes a current or recent location(s) of the client device, temporal data that characterizes a time of day or day of week associated with the client device, state of charge data that characterizes a current state of charge of the client device, and/or other contextual signal(s) associated with the client device. Moreover, the contextual signal(s) can include, for example, one or more contextual signal(s) associated with assistant responses that are generated using a typical pipeline of components as described herein (e.g., based on natural language understanding (NLU) output and/or fulfillment output). Accordingly, the contextual signal(s) differ from the style signal(s) at least in that the style signal(s) primarily focus on the given turn of the ongoing dialog and how to respond to the user at the given turn of the ongoing dialog, whereas the contextual signal(s) generally focus on other information about the user, the client device, and/or information that the automated assistant would typical respond to the user with absent utilization of the LLM.

By using techniques described herein, one or more technical advantages can be achieved. As one non-limiting example, the techniques described herein enable the automated assistant to engage in natural conversations with a user during a dialog session without the user having to specify a NL based response style in the NL based input. Accordingly, a length of the NL based input at each turn of an ongoing dialog can be reduced, thereby reducing a quantity of user inputs received at the client device. As another non-limiting example, various NL based response styles guide the ongoing dialog in a manner that resonates with the user and without the user having to specify any of these NL based response styles in the NL based input. For instance, in implementations where the "terse" NL based response style and/or the "direct" NL based response styles are utilized in controlling the LLM, the resulting NL based responses are typically shorter, thereby causing the ongoing dialog to be concluded in a more quick and efficient manner absent using these particular NL based response styles. Also, for instance, in implementations where the "engaging" NL based response style and/or the "inquisitive" NL based response styles are utilized in controlling the LLM, the resulting NL based responses typically include information that would be provided by the user and/or requested by the user in subsequent turns of the ongoing dialog, thereby also causing the ongoing dialog to be concluded in a more quick and efficient manner absent using these other particular NL based response styles.

As used herein, a "dialog" may include a logically-self-contained exchange between a user and automated assistant (and in some cases, other human participants). The automated assistant may differentiate between multiple dialogs with the user based on various signals, such as passage of time between dialogs, change of user context (e.g., location, before/during/after a scheduled meeting, etc.) between dialogs, detection of one or more intervening interactions between the user and the client device other than dialogs between the user and the automated assistant (e.g., the user switches applications for a while, the user walks away from then later returns to a standalone voice-activated product), locking/sleeping of the client device between dialogs, change of client devices used to interface with the automated assistant, and so forth. As used herein, a "turn" of a dialog may include an input provided by a user during a dialog. In some implementations, the turn of the dialog may be limited to the input provided by the user, whereas in other implementations, the turn of the dialog may include a prior response provided by the automated assistant to which the input provided by the user is responsive and/or a subsequent response provided by the automated assistant that is responsive to the input provided by the user.

The above description is provided as an overview of only some implementations disclosed herein. Those implementations, and other implementations, are described in additional detail herein. Further, it should be understood that techniques disclosed herein can be implemented locally on a client device, remotely by server(s) connected to the client device via one or more networks, and/or both.

DETAILED DESCRIPTION

Figure 1:
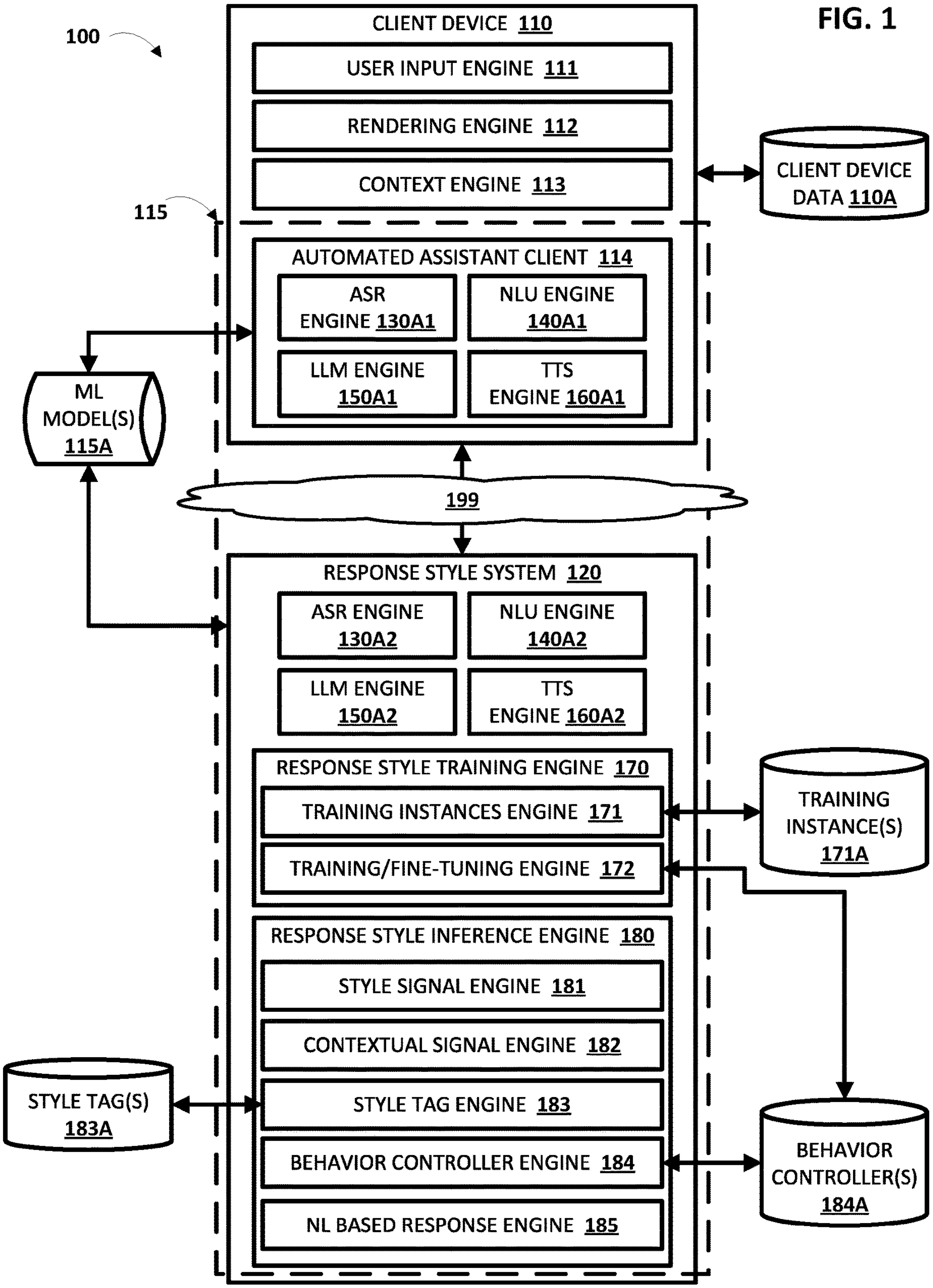
FIG. 1 depicts a block diagram of an example environment that demonstrates various aspects of the present disclosure, and in which implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a client device 110 and a response style system 120. In some implementations, the response style system 120 can be implemented locally at the client device 110. In additional or alternative implementations, the response style system 120 can be implemented remotely from the client device 110 as depicted in FIG. 1 (e.g., at remote server(s)). In these implementations, the client device 110 and the response style system 120 may be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 114. An instance of the automated assistant client 114 can be an application that is separate from an operating system of the client device 110 (e.g., installed "on top" of the operating system)—or can alternatively be implemented directly by the operating system of the client device 110. The automated assistant client 114 can interact with the response style system 120 implemented locally at the client device 110 or via one or more of the networks 199 as depicted in FIG. 1. The automated assistant client 114 (and optionally by way of its interactions with other remote system (e.g., server(s)) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 114 of the client device 110 and the response style system 120. It thus should be understood that a user that engages with the automated assistant client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 114 executing locally on the client device 110 and/or executing remotely at one or more remote servers that may implement the response style system 120.

In various implementations, the client device 110 may include a user input engine 111 that is configured to detect natural language (NL) based input provided by a user of the client device 110 and/or other user inputs using one or more user interface input devices. For example, the client device 110 may be equipped with one or more microphones that capture audio data, such as audio data corresponding to spoken utterances of the user or other sounds in an environment of the client device 110. Additionally, or alternatively, the client device 110 may be equipped with one or more vision components that are configured to capture vision data corresponding to images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

In various implementations, the client device 110 may include a rendering engine 112 that is configured to render content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or projector that enables content to be provided for visual presentation to the user via the client device 110.

In various implementations, the client device 110 may include a context engine 113 that is configured to determine a context (e.g., current or recent context) of the client device 110, of a user of the client device 110 (e.g., an active user of the client device 110 when the client device 110 is associated with multiple users), and/or of a dialog between the user of the client device 110 and the automated assistant 115. In some of those implementations, the context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113. For example, the context engine 113 can determine a current context based on a current state of a dialog (e.g., considering one or more recent turns of the dialog), profile data, and/or a current location of the client device 110. A context determined by the context engine 113 can be utilized, for example, in supplementing or rewriting NL based input detected at the client device 110 (e.g., via the user input engine 111).

Further, the client device 110 and/or the response style system 120 may include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

In some implementations, the operations performed by the automated assistant 115 may be implemented locally at the client device 110 via the automated assistant client 114. As shown in FIG. 1, the automated assistant client 114 may include an automatic speech recognition (ASR) engine 130A1, a natural language understanding (NLU) engine 140A1, a large language model (LLM) engine 150A1, and a text-to-speech (TTS) engine 160A1. In some implementations, the operations performed by the automated assistant 115 may be distributed across multiple computer systems, such as when the response style system 120 is implemented remotely from the client device 110 as depicted in FIG. 1. In these implementations, the automated assistant 115 may additionally or alternatively utilize ASR engine 130A2, NLU engine 140A2, LLM engine 150A2, and TTS engine 160A2 of the natural conversation system 120.

Each of these engines may be configured to perform one or more functions. For example, the ASR engine 130A1 and/or 130A2 can process, using ASR model(s) stored in machine learning (ML) model(s) database 115A (e.g., a recurrent neural network (RNN) model, a transformer model, and/or any other type of ML model capable of performing ASR), a stream of audio data that captures spoken utterance(s) as NL based input and that is generated by microphone(s) of the client device 110 to generate ASR output. Notably, in some implementations, the ASR model can be utilized to generate the ASR output as the audio data is generated (e.g., a streaming ASR model). Further, the NLU engine 140A1 and/or 140A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based rule(s), the ASR output (or other NL based input, such as typed input) to generate NLU output. Moreover, the automated assistant 115 can cause the NLU output to be processed to generate fulfillment data. For instance, the automated assistant 115 can transmit one or more structured request to one or more first-party (1P) systems and/or one or more third-party (3P) systems, and receive fulfillment data from one or more of the 1P systems and/or 3P systems to generate the fulfillment data. The one or more structured requests can be generated based on, for example, the NLU data, and the fulfillment data can correspond to, for example, an NL based response that is responsive to the spoken utterance(s) captured in the audio data processed by the ASR engine 130A1 and/or 130A2 (or other NL based input, such as typed input), one or more actions be performed by the automated assistant 115 based on the spoken utterance(s) captured in the audio data processed by the ASR engine 130A1 and/or 130A2 (or other NL based input, and/or other fulfillment output.

Moreover, the TTS engine 160A1 and/or 160A2 can process, using TTS model(s) stored in the ML model(s) database 115A, a NL based response (e.g., text formulated by the automated assistant 115) to generate synthesized speech audio data that includes computer-generated synthesized speech capturing the NL based response. In implementations where the TTS engine 160A1 and/or 160A2 is utilized to process the NL based response, the TTS engine 160A1 and/or 160A2 can generate the synthesized speech using one or more prosodic properties to reflect a NL based style as described herein. Notably, the ML model(s) stored in the ML model(s) database 115A can be on-device ML models that are stored locally at the client device 110 or shared ML models that are accessible to both the client device 110 and/or remote systems when the response style system 120 is not implemented locally at the client device 110.

In various implementations, the ASR output can include, for example, speech hypotheses (e.g., term hypotheses and/or transcription hypotheses) that are predicted to correspond to spoken utterance(s) of a user that are captured in the audio data, one or more corresponding predicted values (e.g., probabilities, log likelihoods, and/or other values) for each of the speech hypotheses, a plurality of phonemes that are predicted to correspond to spoken utterance(s) of a user that are captured in the audio data, one or more corresponding predicted values (e.g., probabilities, log likelihoods, and/or other values) for each of the plurality of phonemes, and/or other ASR output. In some versions of those implementations, the ASR engine 130A1 and/or 130A2 can select one or more of the speech hypotheses as recognized text that corresponds to the spoken utterance(s) (e.g., based on the corresponding predicted values for each of the speech hypotheses), such as when the ASR engine 160A1 and/or 130A2 utilizes an end-to-end ASR model. In other implementations, the ASR engine 130A1 and/or 130A2 can select one or more of the predicted phonemes (e.g., based on the corresponding predicted values for each of the predicted phonemes), and determine recognized text that corresponds to the spoken utterance(s) based on the one or more predicted phonemes that are selected, such as when the ASR engine 160A1 and/or 130A2 utilizes an ASR model that is not end-to-end. In these implementations, the ASR engine 130A1 and/or 130A2 can optionally employ additional mechanisms (e.g., a directed acyclic graph) to determine the recognized text that corresponds to the spoken utterance(s) based on the one or more predicted phonemes that are selected.

In various implementations, the NLU output can include, for example, annotated recognized text that includes one or more annotations of the recognized text for one or more (e.g., all) of the terms of the recognized text. For example, the NLU engine 140A1 and/or 140A2 may include a part of speech tagger (not depicted) configured to annotate terms with their grammatical roles. Additionally, or alternatively, the NLU engine 140A1 and/or 140A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine 140A1 and/or 140A2 may include a coreference resolver (not depicted) configured to group, or "cluster," references to the same entity based on one or more contextual cues. For example, the coreference resolver may be utilized to resolve the term "them" to "buy theatre tickets" in the NL based input "buy them", based on "theatre tickets" being mentioned in a client device notification rendered immediately prior to receiving input "buy them". In some implementations, one or more components of the NLU engine 140A1 and/or 140A2 may rely on annotations from one or more other components of the NLU engine 140A1 and/or 140A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

As described herein, the automated assistant 115 can additionally, or alternatively, utilize a LLM (e.g., stored in the ML model(s) database 115A) in generating a NL based response that is responsive to the NL based input. For example, the NLU engine 140A1 and/or 140A2 can optionally be omitted, and the LLM engine 150A1 and/or 150A2 can be utilized to process the recognized text generated by the ASR engine 130A1 and/or 130A2 and/or other NL based input (e.g., typed input that is directed to the automated assistant 115), and optionally other data as described herein. Also, for example, in implementations where the NL based input is non-speech based (e.g., the NL based input is typed input), the ASR engine 130A1 and/or 130A2 and the NLU engine 140A1 and/or 140A2 can optionally be omitted, and the LLM engine 150A1 and/or 150A2 can be utilized to process the NL based input. Accordingly, it should be understood that the LLM engine 150A1 and/or 150A2 can be implemented independent of any output generated by various other engines depicted in FIG. 1 (e.g., independent of any ASR output generated using the ASR engine 130A1 and/or 130A2 and/or independent of any NLU output generated using the NLU engine 140A1 and/or 140A2).

As depicted in FIG. 1, the response style system 120 can include a response style training engine 170 and a response style inference engine 180. These various engines of the response style system 120 can include sub-engines. For example, the response style training engine 170 can include a training instances engine 171 and a training/fine-tuning engine 172. Also, for example, the response style inference engine 180 can include a style signal engine 181, a contextual signal engine 182, a style tag engine 183, a behavior controller engine 184, and a NL based response engine 185. Although particular engines and sub-engines are depicted in FIG. 1, it should be understood that is for the sake of example and to illustrate aspects of techniques described herein, and is not meant to be limiting. For example, various engine and/or sub-engines can be added, combined, and/or omitted.

Notably, in generating the NL based response, the automated assistant 115 can utilize the response style system 120 to control a NL based response style of the NL based response. The NL based response style utilized in generating the NL based response can be one of a plurality of disparate types of NL based response styles. Some non-limiting examples of the plurality of disparate types of NL based response styles include a dominant response style, a submissive response style, an inquisitive response style, a proactive response style, an engaging response style, a terse response style, a polite response style, and a direct response style. The plurality of disparate types of NL based response styles are described in more detail herein (e.g., with respect to FIGS. 7A and 7B). In some implementations, the automated assistant 115 can utilize a LLM behavior controller (e.g., as described with respect to FIGS. 2 and 4) to control the NL based response style in generating the NL based response. In these implementations, the LLM behavior controller can be trained prior to utilization by the automated assistant 115 (e.g., as described with respect to FIG. 3) in controlling the NL based response style in generating the NL based response. In some implementations, the automated assistant 115 can utilize a fine-tuned LLM (e.g., as described with respect to FIG. 6) to control the NL based response style in generating the NL based response. In these implementations, the fine-tuned LLM can be fine-tuned with respect to the plurality of disparate response styles prior to utilization by the automated assistant 115 (e.g., as described with respect to FIG. 5).

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., in a household environment, in an enterprise or work environment, in a hospitality environment, etc.).

Figure 2:
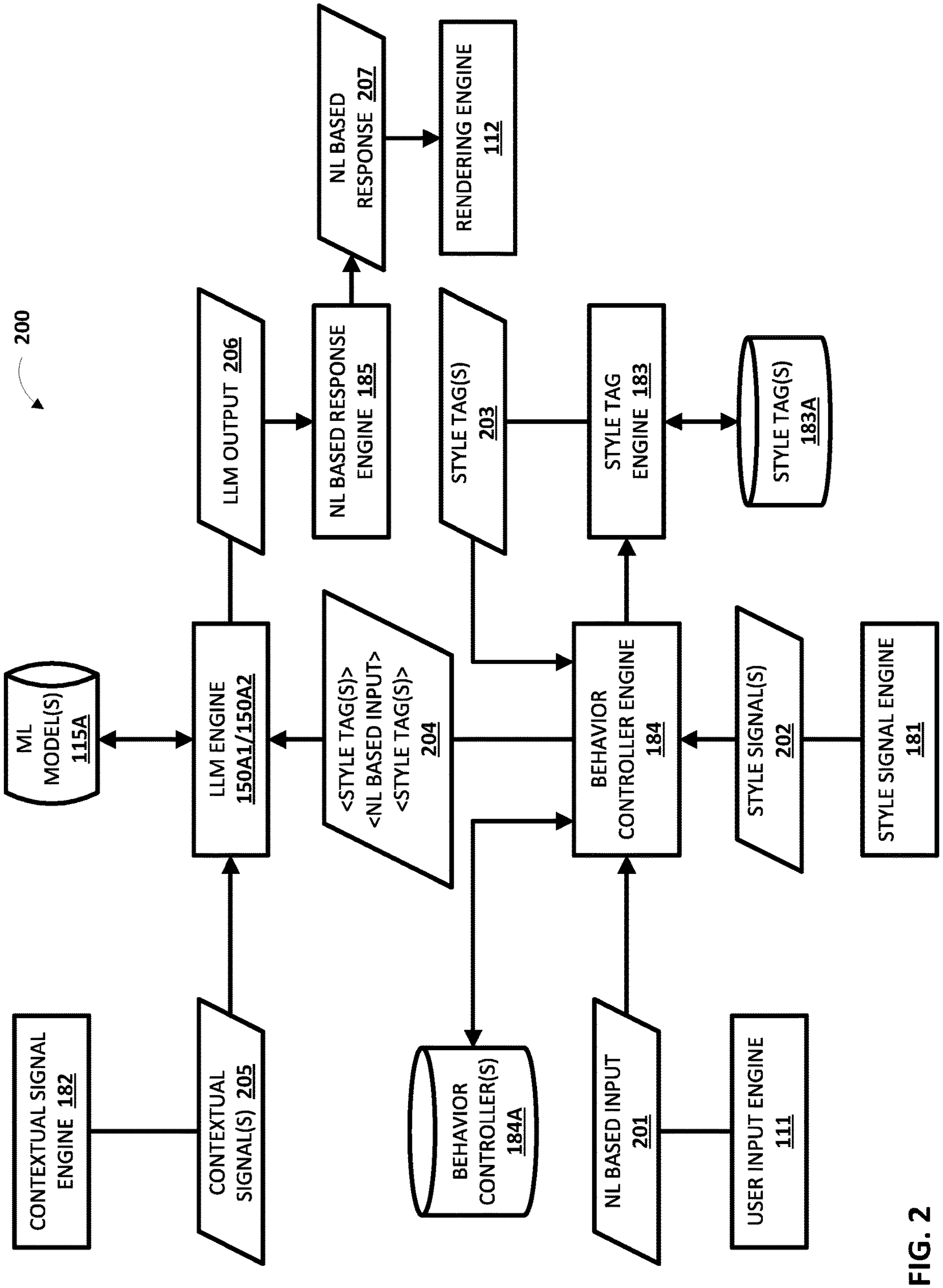
FIG. 2 depicts an example process flow of utilizing a large language model (LLM) behavior controller to control a natural language (NL) based style of a NL based response, in accordance with various implementations.

Turning now to FIG. 2, an example process flow 200 of utilizing a large language model (LLM) behavior controller to control a natural language (NL) based style of a NL based response is depicted. Notably, the process flow 200 of FIG. 2 is described as being implemented by the automated assistant 115 from FIG. 1. For the sake of example, assume that NL based input 201 directed to the automated assistant 115 provided by a user of the client device 110 is detected via the user input engine 111. In some implementations, the NL based input can include spoken utterance(s) directed to the automated assistant 115. In these implementations, the automated assistant 115 can cause the ASR engine 130A1 and/or 130A2 to process audio data that is generated by microphone(s) of the client device 110 and that captures the spoken utterance(s) to generate ASR output, such as recognized text that is predicted to correspond to the spoken utterance(s). In these implementations, the automated assistant 115 can cause the recognized text to be provided to the behavior controller engine 184 as the NL based input 201. In additional or alternative implementations, the NL based input can include typed input directed to the automated assistant 115 (e.g., via an automated assistant software application that is accessible at the client device 110). In these implementations, the automated assistant 115 can cause the typed input to be provided to the behavior controller engine 184 as the NL based input 201. Notably, the NL based input 201 can be provided as part of a given turn of an ongoing dialog between the user of the client device 110 and the automated assistant 115. The NL based input 201 can be provided by the user of the client device 110 to initiate the ongoing dialog or in furtherance of the ongoing dialog.

In various implementations, and for the given dialog turn of the ongoing dialog, the automated assistant 115 can cause the style signal engine 181 to obtain one or more style signals 202. Further, the automated assistant 115 can cause the style signal engine 181 to provide the one or more style signals 202 to the behavior controller engine 184. In implementations where the ongoing dialog is a spoken dialog (e.g., where the NL based input 201 includes the spoken utterance(s)), the one or more style signals can include, for example, one or more prosodic properties of the user determined based on processing the spoken utterance(s), a sentiment of the user determined based on processing the spoken utterance(s), a conversation history between the user of the client device and the automated assistant 115, and/or other signals that can be utilized to inform the automated assistant 115 on a NL based response style that should be utilized in responding to the user during the ongoing dialog.

For example, in addition to causing the ASR engine 130A1 and/or 130A2 to process the audio data to generate the ASR output, the automated assistant 115 can further process the audio data to determine the one or more prosodic properties of the user in providing the spoken utterance(s), such as properties of syllables and larger units of speech, including linguistic functions such as intonation, tone, stress, rhythm, tempo, and pause. The one or more prosodic properties can, in combination, reflect, for example, emotional state, form (e.g., statement, question, or command), irony, sarcasm, and/or emphasis. In determining the one or more prosodic properties of the user in providing the spoken utterance(s), the automated assistant 115 can analyze the audio data, and optionally using various ML model(s) (e.g., stored in the ML model(s) database 115A), such as a prosodic property ML model that is trained to process the audio data to determine prosodic properties.

Additionally, or alternatively, in addition to causing the ASR engine 130A1 and/or 130A2 to process the audio data to generate the ASR output, the automated assistant 115 can further process the audio data to determine a sentiment of the user in providing the spoken utterance(s), such as a positive sentiment, a neutral sentiment, or a negative sentiment. Notably, the sentiment may be defined in varying degrees of granularity, such as the positive sentiment, the neutral sentiment, or the negative sentiment as noted above, or more granular, such as a happy sentiment or excited sentiment in lieu of the broader positive sentiment, or an angry or sad sentiment in lieu of the broader negative sentiment. In determining the sentiment of the user in providing the spoken utterance(s), the automated assistant 115 can analyze the audio data, and optionally using various ML model(s) (e.g., stored in the ML model(s) database 115A), such as a sentiment classifier ML model that is trained to process the audio data to determine the sentiment.

Additionally, or alternatively, in addition to causing the ASR engine 130A1 and/or 130A2 to process the audio data to generate the ASR output, the automated assistant 115 can analyze a conversation history between the user and the automated assistant 115 (e.g., stored in the client device data database 110A). For instance, the automated assistant 115 can determine a frequency of which the user has provided the NL based input 201 or other NL based input that is similar to the NL based input 201 from the conversation history, how the automated assistant 115 previously responded to the NL based input 201 or other NL based input that is similar to the NL based input 201 in the past from the conversation history, how the user responded to those previous responses provided by the automated assistant 115, and/or other information that can determined based on analyzing the conversation history.

Further, in implementations where the ongoing dialog is a textual dialog (e.g., where the NL based input 201 includes the typed input), the one or more style signals can include, for example, a typing speed of the user in providing the typed input, a sentiment of the user determined based on processing the typed input, or a conversation history between the user of the client device and the automated assistant 115, and/or other signals that can be utilized to inform the automated assistant 115 on a NL based response style that should be utilized in responding to the user during the ongoing dialog.

For example, the automated assistant 115 can analyze a typing speed of the user in providing the typed input (and optionally a relative typing speed of the user in providing the typed input that is relative to a baseline typing speed of the user). The typing speed of the user can convey information similar to those conveyed by prosodic properties in terms of intonation, tone, stress, rhythm, tempo, and pause in typing the typed input. Accordingly, the typing speed can also reflect, for example, emotional state, form (e.g., statement, question, or command), irony, sarcasm, and/or emphasis. Additionally, or alternatively, the automated assistant 115 can further process the typed input to determine the sentiment of the user in providing the typed input. In determining the sentiment of the user in providing the typed input, the automated assistant 115 can analyze word(s) or phrase(s) included in the typed input, and optionally using various ML model(s) (e.g., stored in the ML model(s) database 115A), such as a sentiment classifier ML model that is trained to process the word(s) or phrase(s) in the typed input to determine the sentiment. Additionally, or alternatively, the automated assistant 115 can analyze the conversation history between the user and the automated assistant 115 (e.g., stored in the client device data database 110A).

Further, the automated assistant 115 can cause the behavior controller engine 184 to process, using a LLM behavior controller (e.g., that is stored in the behavior controller(s) database 184A and that is previously trained (e.g., as described with respect to FIG. 3)), to modify the NL based input 201 prior to the NL based input 201 being provided to the LLM engine 150A1 and/or 150A2. For example, the automated assistant 115 can cause the behavior controller engine 184 to process, using the LLM behavior controller, the one or more style signals 202, to determine a given NL based response style, from among the plurality of NL based response styles, that is not specified by the NL based input 201 but that is to be utilized in responding to the NL based input 201. In processing the one or more style signals 202 to determine the given NL based response style, the LLM behavior controller can access a previously learned mapping that maps the one or more style signals 202 to the given NL based response style. This enables the LLM behavior controller to modify the NL based input 201 to include one or more NL based response style tags 203 associated with the given NL based response style. In some implementations and as shown in FIG. 2, the automated assistant 115 can cause the behavior controller engine 184 to interact with the style tag engine 183 to obtain the one or more NL based response style tags 203 (e.g., form style tag(s) database 183A) associated with the given NL based response style and based on the learned mapping.

In modifying the NL based input 201, the automated assistant 115 can cause the behavior controller to pre-pend and/or post-pend the NL based input 201 with the one or more NL based response style tags 203 as shown by modified NL based input 204. Accordingly, and even though the user does not explicitly provide the given NL based response style, techniques described herein can be utilized to force the LLM being utilized by the automated assistant 115 to generate a NL based response in the given NL based response style and for the given turn of the ongoing dialog. Notably, the automated assistant 115 can generate NL based responses in the given NL based response style throughout the ongoing dialog (e.g., as described with respect to FIG. 7A) or switch between multiple NL based response styles throughout the ongoing dialog (e.g., as described with respect to FIG. 7B).

Moreover, the automated assistant 115 can cause the LLM engine 150A1 and/or 150A2 to process, using a LLM (e.g., stored in the ML model(s) database 115A), the modified NL based input 204 to generate LLM output 206, and can cause the NL based response engine 185 to generate, based on the LLM output 206, a NL based response 207. The automated assistant 115 can cause the NL based response 207 to be provided for visual and/or audible presentation to the user of the client device 110. The LLM described herein can be any LLM (e.g., LaMDA, BERT, Meena, PaLM, GPT-3, GPT-4, etc.) that is capable of being utilized in processing NL based inputs and generating LLM outputs. The LLM output 206 can include, for example, a probability distribution over a sequence of words or phrases that are predicted to be responsive to the NL based input 201. Accordingly, in generating the LLM output 206 and/or in generating the NL based response 207 based on the LLM output 206, the automated assistant 115 can ensure that the given NL based response style is reflected. The automated assistant 115 can ensure that given NL based response style is reflected by, for example, adjusting a temperature of the LLM to a particular temperature that better reflects the given NL based response style, biasing a selection of the one or more words or phrases for selection in the NL based response 207 towards words or phrases associated with the given NL based response style, causing certain content to be proactively obtained for inclusion in the NL based response, and/or by using other techniques. Some of these examples are described in more detail with respect to FIGS. 7A and 7B. The NL based response 207 can be rendered for audible and/or visual presentation to the user of the client device 110 (e.g., using the rendering engine 112).

In some implementations, and for the given dialog turn of the ongoing dialog, the automated assistant 115 can cause the contextual signal engine 181 to obtain one or more contextual signals 205. Further, the automated assistant 115 can cause the contextual signal engine 182 to provide the one or more contextual signals 205 (or a context determined based on the one or more contextual signals 205 using the context engine 113) to the LLM engine 150A1 and/or 150A2. In turn, the automated assistant 115 can cause the LLM engine 150A1 and/or 150A2 to process, using the LLM, and along with the modified NL based input 204, the one or more contextual signals 205 to generate the LLM output 206. Notably, the one or more contextual signals 205 are distinct from the one or more style signals 202. For instance, as shown in FIG. 2, the one or more contextual signals 205 are not processed by the behavior control engine 184 to determine the given NL based response style for the NL based response 207. In some implementations, the one or more contextual signals 205 are mutually exclusive with respect to the one or more style signals 202, such that there is no overlap between the one or more contextual signals 205 and the one or more style signals 202. However, in other implementations, the one or more contextual signals 205 are not mutually exclusive with respect to the one or more style signals 202, such that there is some overlap between the one or more contextual signals 205 and the one or more style signals 202.

The one or more contextual signals can include, for example, contextual signals associated with the user of the client device 110, such as user profile data that characterizes a user profile of the user of the client device 110, user attribute data that characterizes one or more attributes of the user of the client device 110, user preference data that characterizes one or more preferences of a user of the client device 110, user interaction data that characterizes recent user interactions with the client device, and/or other contextual signals associated with the user of the client device 110. Further, the one or more contextual signals can include, for example, contextual signals associated with the client device 110 itself, such as location data that characterizes a current or recent location(s) of the client device 110, temporal data that characterizes a time of day or day of week associated with the client device 110, state of charge data that characterizes a current state of charge of the client device 110, and/or other contextual signals associated with the client device 110. Moreover, the one or more contextual signals can include, for example, one or more contextual signals associated with assistant responses that are generated using a typical pipeline of components (e.g., based on NLU output and/or fulfillment output), such as NLU output and/or fulfillment output for weather information in instances where the NL based input 201 requests the weather information, NLU output and/or fulfillment output for traffic information in instances where the NL based input requests the traffic information, and/or other assistant responses generated based on NLU output and/or fulfillment output that is responsive to the NL based input 201.

For instance, the one or more contextual signals 205 can indicate that the user of the client device 110 is a "visitor looking for popular events in Louisville, Kentucky" based on a recently issued query, profile data, and an anticipated future location of the client device 110 (e.g., based on recently booked hotel accommodations). Also, for instance, the one or more contextual signals 205 can indicate a software application that is active in the foreground of the client device 110, a current or recent state of the active software application, and/or content currently or recently rendered by the active software application. Also, for instance, the one or more contextual signals 205 can indicate fulfillment output for weather information of "The weather in Louisville, Kentucky right now is 62 degrees and sunny" based on the user of the client device 110 requesting weather information in the NL based input 201, and the automated assistant 115 processing the NL based input 201 using the ASR engine 130A1 and/or 130A2 and/or the NLU engine 140A1 and/or 140A2 to generate the fulfillment output (and optionally interacting with a weather services software application or the like to obtain the weather information).

Although FIG. 2 is described with respect to the automated assistant 115 using additional machinery (e.g., the LLM behavior controller engine 184 using the LLM behavior controller) to ensure the NL based response 207 is in the given NL based response style, it should be understood that is for the sake of example and is not meant to be limiting. For example, in other implementations, the LLM can be fine-tuned with respect to the plurality of disparate NL based response styles (e.g., as described with respect to FIG. 5). In these implementations, the LLM behavior controller engine 184 can be omitted, and the fine-tuned LLM itself can be utilized to ensure the NL based response 207 is in the given NL based response style (e.g., as described with respect to FIG. 6).

Figure 3:
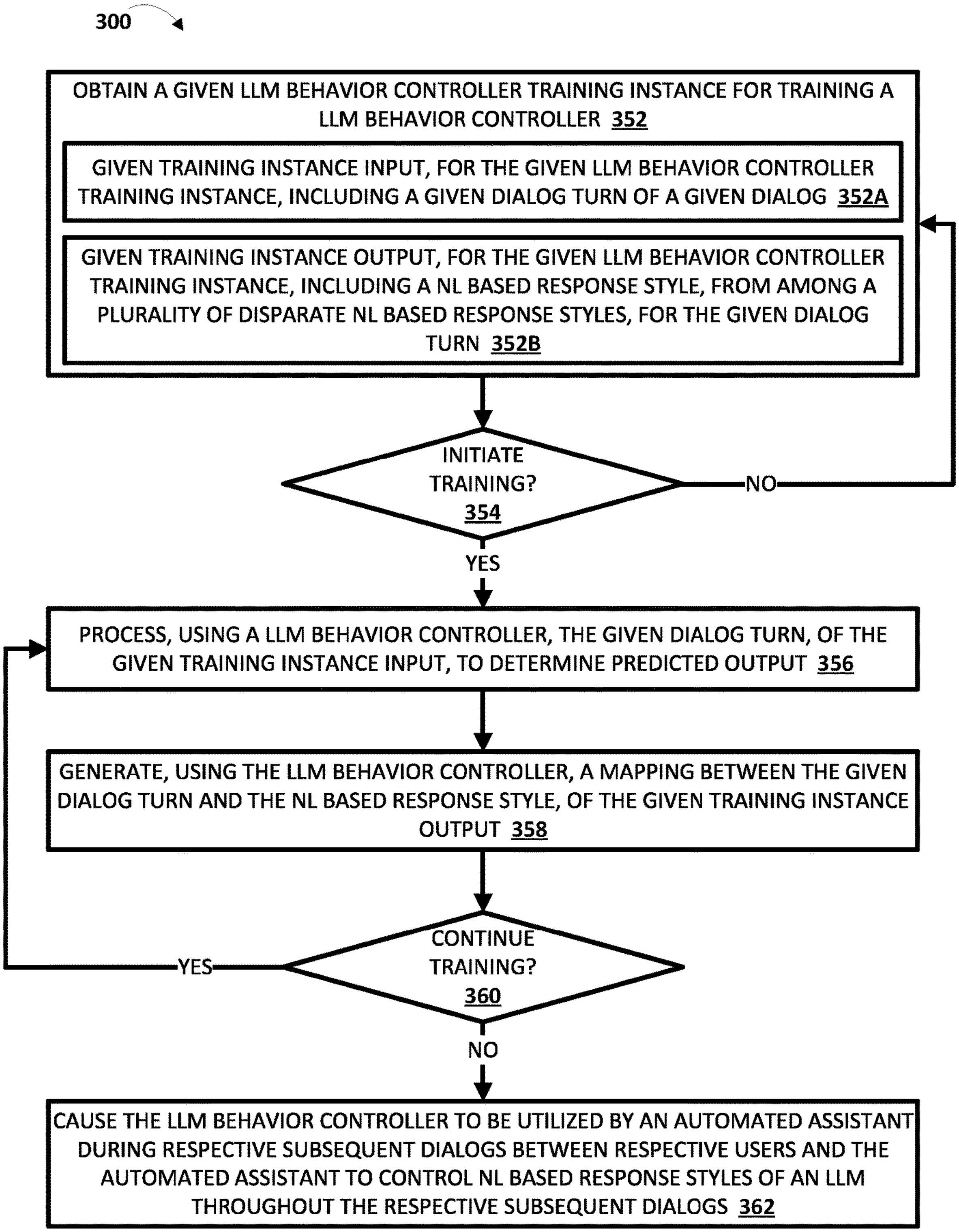
FIG. 3 depicts a flowchart illustrating an example method of training a large language model (LLM) behavior controller to be subsequently utilized in controlling a natural language (NL) based style of a NL based response, in accordance with various implementations.

Turning now to FIG. 3, a flowchart illustrating an example method 300 of training a large language model (LLM) behavior controller to be subsequently utilized in controlling a natural language (NL) based style of a NL based response is depicted. For convenience, the operations of the method 300 are described with reference to a system that performs the operations. This system of the method 300 includes one or more processors, memory, and/or other component(s) of computing device(s) (e.g., client device 110 of FIG. 1, response style system 120 of FIG. 1, client device 710 of FIGS. 7A and 7B, computing device 810 of FIG. 8, one or more servers, and/or other computing devices). Moreover, while operations of the method 300 are shown in a particular order, this is not meant to be limiting. One or more operations may be reordered, omitted, and/or added.

At block 352, the system obtains a given LLM behavior controller training instance for training a LLM behavior controller (e.g., using the training instances engine 171). For example, and indicated at block 352A, the given LLM behavior controller training instance can include given training instance input that includes a given dialog turn of a given dialog. Further, and as indicated at block 352B, the given LLM behavior controller training instance can include given training instance output that includes a NL based response style, from among a plurality of disparate NL based response styles, for the given dialog turn of the given training instance input. In some implementations, the given LLM behavior controller training instance for training the LLM behavior controller can be obtained from one or more databases (e.g., from training instance(s) database 171A). In some versions of these implementations, the training instance(s) database 171A can include training instances that are pre-curated and generated based on prior dialogs between users or users and respective automated assistants. In additional or alternative implementations, the given LLM behavior controller training instance can be generated by the system based on prior dialogs between users or users and respective automated assistants. In additional or alternative implementations, the given LLM behavior controller training instance can be obtained from a third-party, such as an entity that is different from an entity that manages or hosts the system.

At block 354, the system determines whether to initiate training of the LLM behavior controller. The system can determine whether to initiate training of the LLM behavior controller in response to determining whether one or more conditions are satisfied. The one or more conditions can include, for example, whether a threshold quantity of LLM behavior controller training instances have been obtained for training the LLM behavior controller, a time of day, a day of week, whether a threshold quantity of computational resources are available for training the LLM behavior controller, and/or other conditions. If, at an iteration of block 354, the system determines not to initiate training of the LLM behavior controller, the system returns to block 352 to obtain a given additional LLM behavior controller training instance. If, at an iteration of block 354, the system determines to initiate training of the LLM behavior controller, the system proceeds to block 356.

At block 356, the system processes, using the LLM behavior controller, the given dialog turn, of the given training instance input, to determine predicted output. The predicted output can include, for example, one or more predicted NL based response styles, corresponding values (e.g., probabilities, log-likelihoods, and/or other values) associated with the one or more predicted NL based response styles, and/or other predicted output determined based on processing the given dialog turn. For example, in implementations where the given dialog turn is for a spoken dialog, the system can process audio data capturing spoken utterance(s) for the given dialog turn to determine one or more prosodic properties for the spoken utterance(s) captured in the audio data, one or more sentiments for the spoken utterance(s) captured in the audio data, whether the spoken utterance(s) are captured in additional audio data of given additional training instance input of additional training instance(s) that have been previously processed, and/or other style signal(s) for the given turn of the spoken dialog. Further, and based on the prosodic properties for the spoken utterance(s), the one or more sentiments for the spoken utterance(s), and/or whether the spoken utterance(s) are captured in the additional audio data of the additional training instance(s), the system can determine the one or more predicted NL based response styles (and optionally the corresponding values associated therewith) as the predicted output.

For instance, assume that the given dialog turn captures a spoken utterance of "Hey Assistant, what's the weather today?", and further assume that the prosodic properties for the spoken utterance and the sentiment for the spoken utterance indicate that a user that provided the spoken is indifferent. In this instance, the one or more predicted NL based response styles can include a first "engaging" NL based response style that is associated with a first corresponding value that attempt to drive a ongoing dialog beyond a single turn of the ongoing dialog, a second "terse" NL based response style that is associated with a second corresponding value that mirrors the style of the user in providing the spoken utterance, a third "inquisitive" NL based response style that is associated with a third corresponding value that attempt to drive an ongoing dialog beyond a single turn of the ongoing dialog and solicit an additional spoken utterance of the user, and so on for other NL based response styles.

As another example, in implementations where the given dialog turn is for a textual dialog, the system can process textual data capturing typed input (and optionally characteristics of the typed input, such as a typing speed at which the typed input was provided) for the given dialog turn to determine characteristics of the typed input (e.g., a typing speed at which the typed input was provided and/or other characteristics), one or more sentiments for one or more words or phrases captured in the typed input, whether the typed input is captured in additional textual data of given additional training instance input of additional training instance(s) that have been previously processed, and/or other style signal(s) for the given turn of the spoken dialog. Further, and based on the characteristics of the typed input, the one or more sentiments for the typed input, and/or whether the typed input is captured in additional textual data the additional training instance(s), the system can determine the one or more predicted NL based response styles (and optionally the corresponding values associated therewith) as the predicted output.

At block 358, the system generates, using the LLM behavior controller, a mapping between the given dialog turn and the NL based response style, of the given training instance output. In generating the mapping between the given dialog turn and the NL based response style, the system can compare the one or more predicted NL based responses styles of the predicted output generated based on processing the given training instance input and the NL based response style of the given training instance output. For instance, again assume that the given dialog turn captures a spoken utterance of "Hey Assistant, what's the weather today?", and assume that the one or more predicted NL based response styles can include the first "engaging" NL based response style and the first corresponding value, the second "terse" NL based response style and the second corresponding value, and the third "inquisitive" NL based response style and the third corresponding value. Further assume that the NL based response style of the given training instance output corresponds to the "engaging" NL based response style. In this instance, the "engaging" NL based response style can be utilized as ground truth to indicate that the style signal(s) for the given turn of the spoken dialog should be mapped to the "engaging" NL based response style and can be associated with a corresponding ground truth value. Accordingly, in comparing the one or more predicted NL based responses styles of the predicted output generated based on processing the given training instance input and the NL based response style of the given training instance output, the system can compare each of the first "engaging" NL based response style and the first corresponding value, the second "terse" NL based response style and the second corresponding value, and the third "inquisitive" NL based response style and the third corresponding value to the ground truth "engaging" NL based response style and the corresponding ground truth value. In this manner, the system can cause the LLM behavior controller to learn a mapping between style signal(s) for an ongoing dialog and the NL based response styles.

At block 360, the system determines whether to continue training the LLM behavior controller. The system can determine whether to continue training of the LLM behavior controller in response to determining whether one or more conditions are satisfied. The one or more conditions can include, for example, whether a threshold quantity of LLM behavior controller training instances have been utilized for training the LLM behavior controller, a time of day, a day of week, whether a threshold quantity of computational resources are still available for training the LLM behavior controller, whether a threshold performance metric for the LLM behavior controller has been achieved, and/or other conditions. If, at an iteration of block 360, the system determines to continue training the LLM behavior controller, the system returns to block 356 to continue training the LLM behavior controller using a given additional LLM behavior controller training instance. If, at an iteration of block 360, the system determines not to continue training the LLM behavior controller, the system proceeds to block 362.

Figure 4:
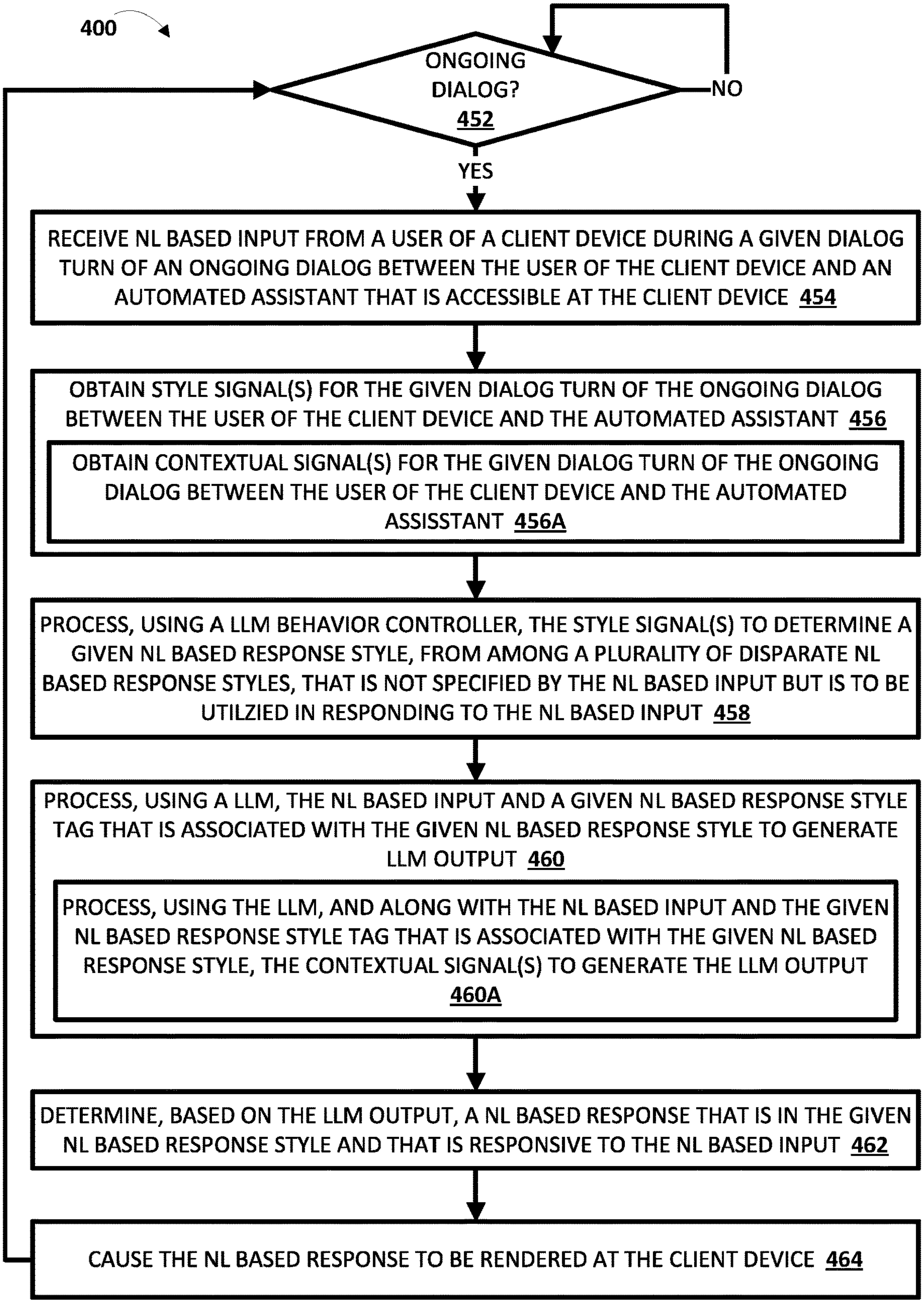
FIG. 4 depicts a flowchart illustrating an example method of utilizing a large language model (LLM) behavior controller to control a natural language (NL) based style of a NL based response, in accordance with various implementations.

At block 362, the system causes the LLM behavior controller to be utilized by an automated assistant during respective subsequent dialogs between respective users and the automated assistant to control NL based response styles of a LLM throughout the respective subsequent dialogs (e.g., as described with respect to FIG. 4). Accordingly, the LLM behavior controller can be initially trained and subsequently utilized by the automated assistant to ensure that NL based responses generated in response to receiving NL based inputs reflect a desired style.

Although the method 300 of FIG. 3 is described herein with respect to the system using a particular technique for learning the mapping between the style signal(s) and the NL based response styles, it should be understood that is one example and should not be limiting. For example, in additional or alternative implementations, the system can receive the mapping from a developer associated with the system such that the mapping is heuristically defined by the developer. In these implementations, the mapping that is heuristically defined can correspond to rules for how the automated assistant should cause the LLM to adapt the NL based response style throughout the ongoing dialog.

Turning now to FIG. 4, a flowchart illustrating an example method 400 of utilizing a large language model (LLM) behavior controller to control a natural language (NL) based style of a NL based response is depicted. For convenience, the operations of the method 400 are described with reference to a system that performs the operations. This system of the method 400 includes one or more processors, memory, and/or other component(s) of computing device(s) (e.g., client device 110 of FIG. 1, response style system 120 of FIG. 1, client device 710 of FIGS. 7A and 7B, computing device 810 of FIG. 8, one or more servers, and/or other computing devices). Moreover, while operations of the method 400 are shown in a particular order, this is not meant to be limiting. One or more operations may be reordered, omitted, and/or added.

At block 452, the system determines whether there is an ongoing dialog between a user of a client device and an automated assistant that is accessible at the client device. The ongoing dialog can be a spoken dialog or a textual dialog. If, at an iteration of block 452, the system determines that there is not an ongoing dialog between the user of the client device and the automated assistant, then the system continues monitoring for the ongoing dialog between the user of the client device and the automated assistant at block 452. If, at an iteration of block 452, the system determines that there is an ongoing dialog between the user of the client device and the automated assistant, then the system proceeds to block 454.

At block 454, the system receives NL based input from a user of a client device during a given dialog turn of an ongoing dialog between the user of the client device and the automated assistant that is accessible at the client device (e.g., as described with respect to the user input engine 111 of FIG. 1). The NL based input can be, for example, a spoken utterance provided by the user of the client device and directed to the automated assistant, or a typed input provided by the user of the client device and directed to the automated assistant.

At block 456, the system obtains one or more style signals for the given dialog turn of the ongoing dialog between the user of the client device and the automated assistant (e.g., as described with respect to the style signal engine 181 of FIGS. 1 and 2). In some implementations, and as indicated at block 456A, the system also obtains one or more contextual signals for the given dialog turn of the ongoing dialog between the user of the client device and the automated assistant (e.g., as described with respect to the contextual signal engine 182 of FIGS. 1 and 2).

At block 458, the system processes, using a LLM behavior controller, the one or more style signals to determine a given NL based response style, from among a plurality of disparate NL based response styles, that is not specified by the NL based input but is to be utilized in responding to the NL based input (e.g., as described with respect to the behavior controller engine 184 of FIGS. 1 and 2). Put another way, the system can utilize a learned mapping (e.g., learned according to the method 300 of FIG. 3 as described above) from style signals to NL based response styles to determine the given NL based response style based on the one or more style signals that are obtained for the given turn of the ongoing dialog.

At block 460, the system processes, using a LLM, the NL based input and a given NL based response style tag that is associated with the given NL based response style to generate LLM output (e.g., as described with respect to the LLM engine 150A1 and/or 150A2 of FIGS. 1 and 2). In some implementations, and as indicated at block 460A, the system also processes, using the LM, and along with the NL based input and the given NL based response style tag that is associated with the given NL based response style, the one or more contextual signals to generate the LLM output. At block 462, the system determines, based on the LLM output, a NL based response that is in the given NL based response style and that is responsive to the NL based input (e.g., as described with respect to the NL based response engine 185 of FIGS. 1 and 2). The given NL based response style tag can be obtained from one or more databases that are accessible to the system (e.g., the style tag(s) database 183A) and can encode information that causes the NL based response to reflect the given NL based response style (e.g., as described with respect to FIGS. 7A and 7B).

At block 464, the system causes the NL based response to be rendered at the client device. The system returns to block 452 to perform an additional iteration of the method 400 of FIG. 4. In some implementations, the NL based response can be rendered for audible presentation to the user via speaker(s) of the client device. In these implementations, the system can process textual data corresponding to the NL based response (e.g., using the TTS engine 160A1 and/or 160A2) to generate synthesized speech audio data including synthesized speech that corresponds to the NL based response, and cause the synthesized speech audio data to be audibly rendered for presentation to the user of the client device via the speaker(s) of the client device. In some versions of these implementations, the synthesized speech audio data can be synthesized using prosodic properties that are stored in association with the given NL based response style in one or more databases that are accessible to the system. Accordingly, not only does the content included in the NL based response reflect the given NL based response style, but the synthesized speech itself can also reflect the given NL based response style. In additional or alternative implementations, the NL based response can be rendered for visual presentation to the user via a display of the client device. In some versions of these implementations, the system can cause the NL based response to be provided for visual presentation to the user in a streaming manner (e.g., as the NL based response is generated).

Although the method 400 of FIG. 4 is described with respect to using the LLM behavior controller to control the NL based response style, it should be understood that is for the sake of example and is not meant to be limiting. For example, and as described with respect to FIGS. 5 and 6, other techniques are contemplated herein to effectively control the NL based response style through utilization of the style tag(s).

Figure 5:
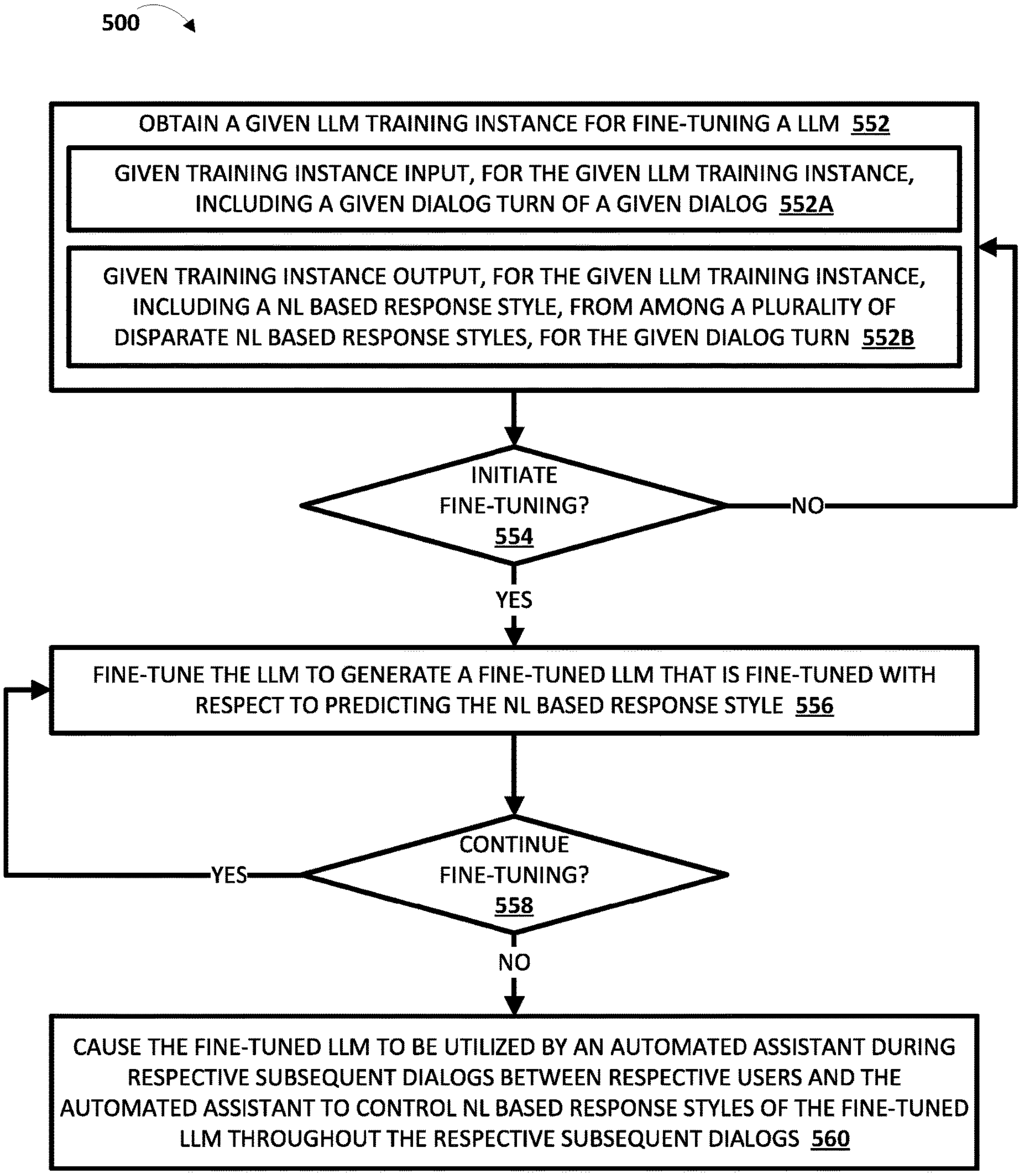
FIG. 5 depicts a flowchart illustrating an example method of fine-tuning a large language model (LLM) to control a natural language (NL) based style of a NL based response, in accordance with various implementations.

Turning now to FIG. 5, a flowchart illustrating an example method 500 of fine-tuning a large language model (LLM) to control a natural language (NL) based style of the LLM is depicted. For convenience, the operations of the method 500 are described with reference to a system that performs the operations. This system of the method 500 includes one or more processors, memory, and/or other component(s) of computing device(s) (e.g., client device 110 of FIG. 1, response style system 120 of FIG. 1, client device 710 of FIGS. 7A and 7B, computing device 810 of FIG. 8, one or more servers, and/or other computing devices). Moreover, while operations of the method 500 are shown in a particular order, this is not meant to be limiting. One or more operations may be reordered, omitted, and/or added.

At block 552, the system obtains a given LLM training instance for fine-tuning a LLM. For example, and indicated at block 552A, the given LLM training instance can include given training instance input that includes a given dialog turn of a given dialog. Further, and as indicated at block 552B, the given LLM training instance can include given training instance output that includes a NL based response style, from among a plurality of disparate NL based response styles, for the given dialog turn of the given training instance input. In some implementations, the given LLM training instance for fine-tuning the LLM can be obtained from one or more databases (e.g., from training instance(s) database 171A). In some versions of these implementations, the training instance(s) database 171A can include training instances that are pre-curated and generated based on prior dialogs between users or users and respective automated assistants. In additional or alternative implementations, the given LLM training instance can be generated by the system based on prior dialogs between users or users and respective automated assistants. In additional or alternative implementations, the given LLM training instance can be obtained from a third-party, such as an entity that is different from an entity that manages or hosts the system.

At block 554, the system determines whether to initiate fine-tuning of the LLM. The system can determine whether to initiate fine-tuning of the LLM in response to determining whether one or more conditions are satisfied. The one or more conditions can include, for example, whether a threshold quantity of LLM training instances have been obtained for fine-tuning the LLM, a time of day, a day of week, whether a threshold quantity of computational resources are available for fine-tuning the LLM, and/or other conditions. If, at an iteration of block 554, the system determines not to initiate fine-tuning of the LLM, the system returns to block 552 to obtain a given additional LLM training instance. If, at an iteration of block 554, the system determines to initiate fine-tuning of the LLM, the system proceeds to block 556.

At block 556, the system fine-tunes the LLM to generate a fine-tuned LLM that is fine-tuned with respect to predicting the NL based response style. In fine-tuning the LLM, the system can utilize any known fine-tuning technique with a fine-tuning task of determining the NL based response style of the given training instance output based on processing the given dialog turn of the given training instance input. Put another way, rather than training a separate LLM behavior controller as described with respect to the method 300 of FIG. 3, the system can alternatively fine-tune the LLM to determine the NL based response style throughout the ongoing dialog, thereby obviating the need for the LLM behavior controller.

At block 558, the system determines whether to continue fine-tuning the LLM. The system can determine whether to continue fine-tuning of the LLM in response to determining whether one or more conditions are satisfied. The one or more conditions can include, for example, whether a threshold quantity of LLM training instances have been utilized for fine-tuning the LLM, a time of day, a day of week, whether a threshold quantity of computational resources are still available for fine-tuning the LLM, whether a threshold performance metric for the fine-tuned LLM has been achieved, and/or other conditions. If, at an iteration of block 558, the system determines to continue fine-tuning the LLM, the system returns to block 556. If, at an iteration of block 558, the system determines not to continue fine-tuning the LLM, the system proceeds to block 560.

Figure 6:
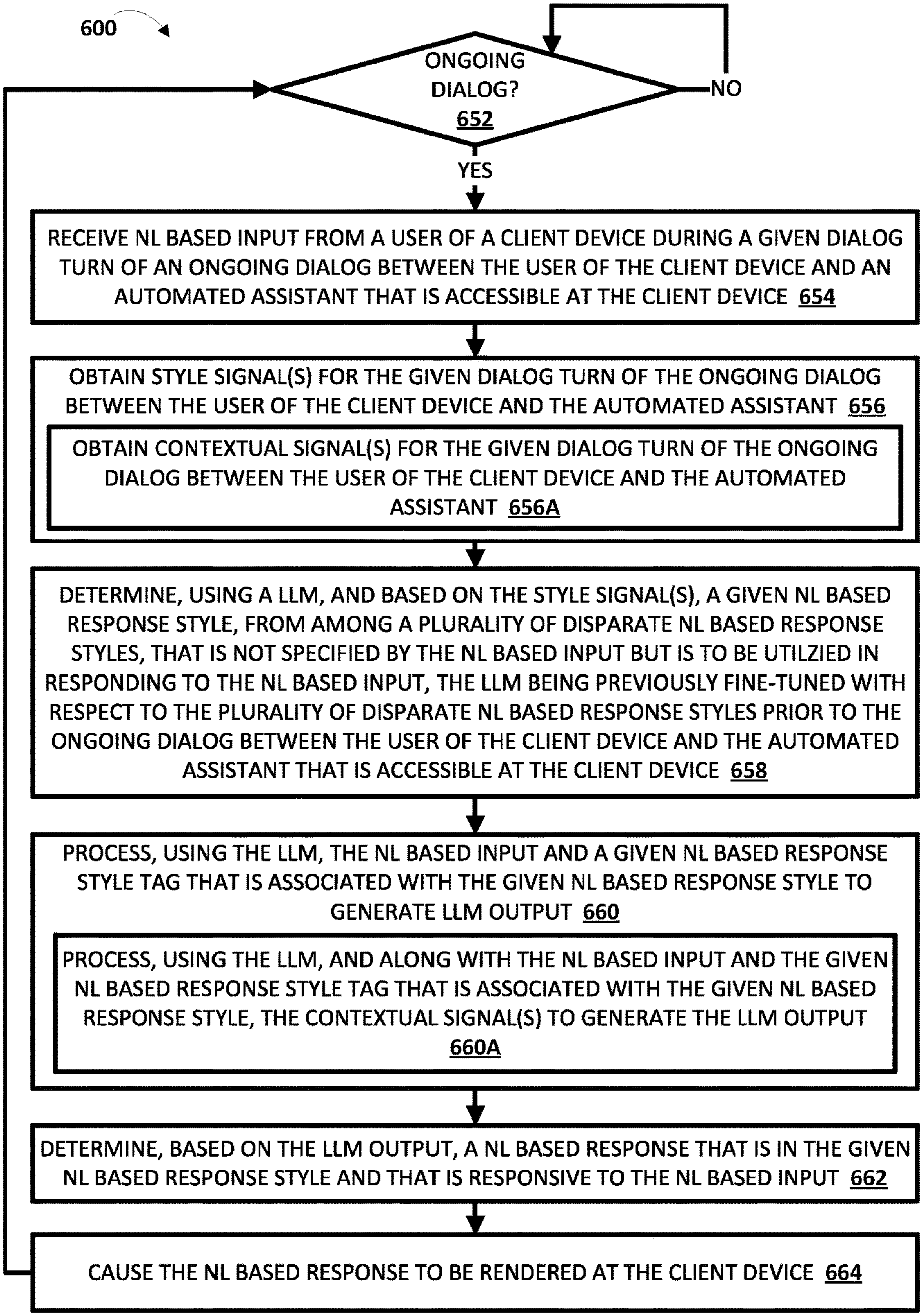
FIG. 6 depicts a flowchart illustrating an example method of utilizing a fine-tuned large language model (LLM) that is fine-tuned to control a natural language (NL) based style of a NL based response, in accordance with various implementations.

At block 560, the system causes the fine-tuned LLM to be utilized by an automated assistant during subsequent dialogs between respective users and the automated assistant to control NL based response styles of the fine-tuned LLM throughout the respective subsequent dialogs (e.g., as described with respect to FIG. 6). Accordingly, the LLM can be initially fine-tuned and subsequently utilized by the automated assistant to ensure that NL based responses generated in response to receiving NL based inputs reflect a desired style. Notably, these implementations do not require any LLM behavior controller as described with respect to FIGS. 2-4.

Turning now to FIG. 6, a flowchart illustrating an example method 600 of utilizing a fine-tuned large language model (LLM) that is fine-tuned to control a natural language (NL) based style of the LLM is depicted. For convenience, the operations of the method 600 are described with reference to a system that performs the operations. This system of the method 600 includes one or more processors, memory, and/or other component(s) of computing device(s) (e.g., client device 110 of FIG. 1, response style system 120 of FIG. 1, client device 710 of FIGS. 7A and 7B, computing device 810 of FIG. 8, one or more servers, and/or other computing devices). Moreover, while operations of the method 600 are shown in a particular order, this is not meant to be limiting. One or more operations may be reordered, omitted, and/or added.

At block 652, the system determines whether there is an ongoing dialog between a user of a client device and an automated assistant that is accessible at the client device. The ongoing dialog can be a spoken dialog or a textual dialog. If, at an iteration of block 652, the system determines that there is not an ongoing dialog between the user of the client device and the automated assistant, then the system continues monitoring for the ongoing dialog between the user of the client device and the automated assistant at block 652. If, at an iteration of block 652, the system determines that there is an ongoing dialog between the user of the client device and the automated assistant, then the system proceeds to block 654.

At block 654, the system receives NL based input from a user of a client device during a given dialog turn of an ongoing dialog between the user of the client device and the automated assistant that is accessible at the client device (e.g., as described with respect to the user input engine 111 of FIG. 1). The NL based input can be, for example, a spoken utterance provided by the user of the client device and directed to the automated assistant, or a typed input provided by the user of the client device and directed to the automated assistant.

At block 656, the system obtains one or more style signals for the given dialog turn of the ongoing dialog between the user of the client device and the automated assistant (e.g., as described with respect to the style signal engine 181 of FIGS. 1 and 2). In some implementations, and as indicated at block 656A, the system also obtains one or more contextual signals for the given dialog turn of the ongoing dialog between the user of the client device and the automated assistant (e.g., as described with respect to the contextual signal engine 182 of FIGS. 1 and 2).

At block 658, the system determines, using a LLM, and based on the one or more style signals, a given NL based response style, from among a plurality of disparate NL based response styles, that is not specified by the NL based input but is to be utilized in responding to the NL based input, the LLM being previously fine-tuned with respect to the plurality of disparate NL based response styles prior to the ongoing dialog between the user of the client device and the automated assistant that is accessible at the client device (e.g., as described with respect to the method 500 of FIG. 5). Put another way, rather than using the LLM behavior controller to process the one or more style signals to determine the given NL based response style, the LLM can be fine-tuned to determine the given NL based response style directly and without utilization of the LLM behavior controller. By fine-tuning the LLM to determine the given NL based response style directly and without utilization of the LLM behavior controller, latency in providing a NL based response that is responsive to the NL based input can be reduced.

At block 660, the system processes, using the LLM, the NL based input and a given NL based response style tag that is associated with the given NL based response style to generate LLM output (e.g., as described with respect to the LLM engine 150A1 and/or 150A2 of FIGS. 1 and 2). In some implementations, and as indicated at block 660A, the system also processes, using the LM, and along with the NL based input and the given NL based response style tag that is associated with the given NL based response style, the one or more contextual signals to generate the LLM output. At block 662, the system determines, based on the LLM output, a NL based response that is in the given NL based response style and that is responsive to the NL based input (e.g., as described with respect to the NL based response engine 185 of FIGS. 1 and 2). The given NL based response style tag can be obtained from one or more databases that are accessible to the system (e.g., the style tag(s) database 183A) and can encode information that causes the NL based response to reflect the given NL based response style (e.g., as described with respect to FIGS. 7A and 7B).

At block 664, the system causes the NL based response to be rendered at the client device. The system returns to block 652 to perform an additional iteration of the method 600 of FIG. 6. As described above with respect to the operations of block 464 of the method 400 of FIG. 4, the NL based response can be rendered for audible presentation to the user via speaker(s) of the client device and/or for visual presentation to the user via a display of the client device.

Figure 7A:
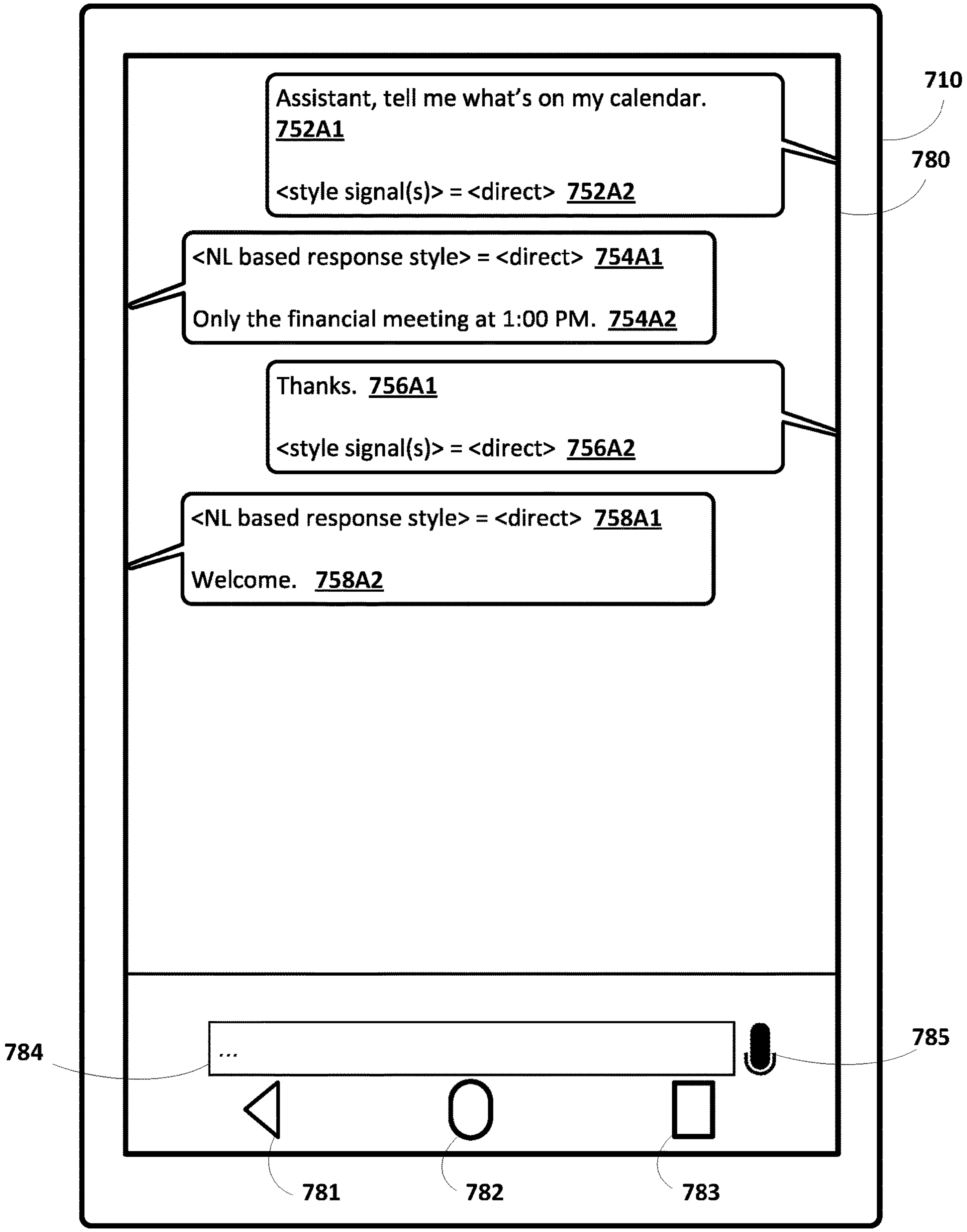
FIG. 7A and FIG. 7B depict various non-limiting examples of ongoing dialogs between a user and an automated assistant where the automated assistant utilizes a large language model (LLM) and controls a natural language (NL) based style of a NL based response, in accordance with various implementations.
Figure 7B:
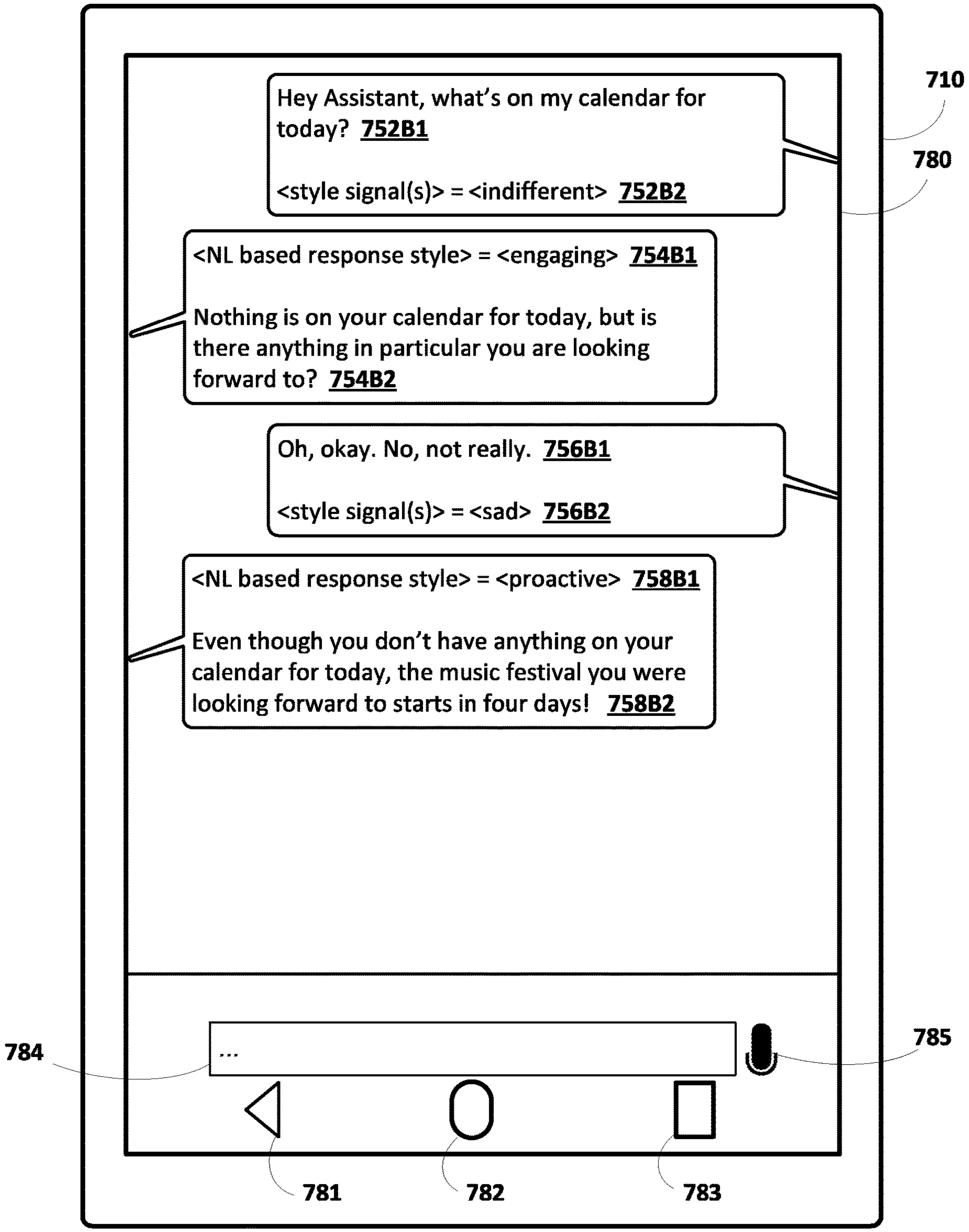

Turning now to FIGS. 7A and 7B, various non-limiting examples of ongoing dialogs between a user and an automated assistant where the automated assistant utilizes a large language model (LLM) and controls a natural language (NL) based style of the LLM are depicted. A client device 710 (e.g., an instance of the client device 110 of FIG. 1) may include various user interface components including, for example, microphone(s) to generate audio data based on spoken utterances and/or other audible input, speaker(s) to audibly render synthesized speech and/or other audible output, and/or a display 780 to visually render visual output. Further, the display 780 of the client device 710 can include various system interface elements 781, 782, and 783 (e.g., hardware and/or software interface elements) that may be interacted with by a user of the client device 710 to cause the client device 710 to perform one or more actions. The display 780 of the client device 710 enables the user to interact with content rendered on the display 780 by touch input (e.g., by directing user input to the display 780 or portions thereof (e.g., to a text entry box 784, to a keyboard (not depicted), or to other portions of the display 780)) and/or by spoken input (e.g., by selecting microphone interface element 785—or just by speaking without necessarily selecting the microphone interface element 785 (i.e., an automated assistant may monitor for one or more terms or phrases, gesture(s) gaze(s), mouth movement(s), lip movement(s), and/or other conditions to activate spoken input) at the client device 810). Although the client device 710 depicted in FIGS. 7A and 7B is a mobile phone, it should be understood that is for the sake of example and is not meant to be limiting. For example, the client device 710 may be a standalone speaker with a display, a standalone speaker without a display, a home automation device, an in-vehicle system, a laptop, a desktop computer, and/or any other device capable of executing an automated assistant to engage in a human-to-computer dialog with the user of the client device 710.

Referring specifically to FIG. 7A, assume that a user of the client device 710 provides NL based input 752A1 of "Assistant, tell me what's on my calendar." Further assume that the NL based input 752A1 is a spoken utterance, and that the automated assistant determines, based on processing one or more style signals obtained when the NL based input 752A1 was provided, that the user is being direct as indicated by 752A2. For instance, one or more prosodic properties determined based on processing audio data that captures the spoken utterance can indicate that the user provided the spoken utterance in a direct tone with a fast rhythm and low pitch. Accordingly, in this example, the automated assistant can determine that a NL based response style to be utilized in generating a NL based response should be a "direct" NL based response style as indicated by 754A1. Thus, in generating a NL based response 754A2 of "Only the financial meeting at 1:00 PM", the automated assistant can cause the LLM to use the "direct" NL based response style. In this example, the "direct" NL based response style attempts to mirror the behavior of the user of the client device 710, and a "direct" style tag can be utilized to encode information to force the NL based response 754A2 to reflect this style. Notably, content selected for inclusion in the NL based response 754A2 does not include any filler words and does not include any content to further drive the ongoing dialog. Rather, the "direct" NL based response style simply answers the question embedded in the NL based input 752A1. Accordingly, the information that is encoded in the style tag(s) can include, for example, one or more prompts (e.g., textual data of "in a direct style") utilized by the LLM in generating the NL based response 754A2, one or more tokens (e.g., a "direct" token) utilized by the LLM in generating the NL based response 754A2, and/or other information to force the LLM to reflect the "direct" response style in generating the NL based response 754A2.

Further assume that the user of the client device 710 provides additional NL based input 756A1 of "Thanks." Further assume that the NL based input 756A1 is an additional spoken utterance, and that the automated assistant determines, based on processing one or more style signals obtained when the additional NL based input 756A1 was provided, that the user is still being direct as indicated by 756A2. For instance, one or more additional prosodic properties determined based on processing additional audio data that captures the additional spoken utterance can indicate that the user provided the additional spoken utterance in the same direct tone with the same fast rhythm and low pitch. Accordingly, in this example, the automated assistant can determine that an additional NL based response style to be utilized in generating an additional NL based response should also be a "direct" NL based response style as indicated by 758A1. Thus, in generating an additional NL based response 758A2 of "Welcome", the automated assistant can cause the LLM to continue using the "direct" NL based response style. In this example, the "direct" NL based response style still attempts to mirror the behavior of the user of the client device 710 throughout the ongoing dialog. However, it should be understood that the style signals can be obtained at each turn of the ongoing dialog such that the NL based style can be dynamically adapted throughout the ongoing dialog.

Referring specifically to FIG. 7B, assume that a user of the client device 710 provides NL based input 752B1 of "Hey assistant, what's on my calendar for today?" Further assume that the NL based input 752B1 is a spoken utterance, and that the automated assistant determines, based on processing one or more style signals obtained when the NL based input 752B1 was provided, that the user is being indifferent as indicated by 752B2. For instance, one or more prosodic properties determined based on processing audio data that captures the spoken utterance can indicate that the user provided the spoken utterance in an indifferent tone with a medium rhythm and medium pitch. Accordingly, in this example, the automated assistant can determine that a NL based response style to be utilized in generating a NL based response should be an "engaging" NL based response style as indicated by 754B1. Thus, in generating a NL based response 754B2 of "Nothing is on your calendar for today, but is there anything in particular you are looking forward to?", the automated assistant can cause the LLM to use the "engaging" NL based response style. In this example, the "engaging" NL based response style attempts to focus on content to further drive the ongoing dialog, and an "engaging" style tag can be utilized to encode information to force the NL based response 754B2 to reflect this style. Notably, content selected for inclusion in the NL based response 754B2 includes a question to further drive the ongoing dialog (e.g., "is there anything in particular you are looking forward to?"). Accordingly, the information that is encoded in the style tag(s) can include, for example, one or more prompts (e.g., textual data of "in an engaging style") utilized by the LLM in generating the NL based response 754B2, one or more tokens (e.g., an "engaging" token) utilized by the LLM in generating the NL based response 754B2, and/or other information to force the LLM to reflect the "engaging" response style in generating the NL based response 754B2.

Further assume that the user of the client device 710 provides additional NL based input 756B1 of "Oh, okay. No, not really." Further assume that the NL based input 756B1 is an additional spoken utterance, and that the automated assistant determines, based on processing one or more style signals obtained when the additional NL based input 756B1 was provided, that the user is sad as indicated by 756B2. For instance, one or more additional prosodic properties determined based on processing additional audio data that captures the additional spoken utterance can indicate that the user provided the additional spoken utterance in the same indifferent tone, but with a slow rhythm and low pitch. Accordingly, in this example, the automated assistant can determine that an additional NL based response style to be utilized in generating an additional NL based response should be a "proactive" NL based response style as indicated by 758B1. Thus, in generating an additional NL based response 758B2 of "Even though you don't have anything on your calendar for today, the music festival you were looking forward to starts in four days!", the automated assistant can cause the LLM to switch from the "engaging" NL based response style to the "proactive" NL based response style. In this example, the "proactive" NL based response style leverages calendar information of the user of the client device 710 and/or other contextual signals to determine that the user previously purchased tickets to the music festival. Accordingly, the information that is encoded in the style tag(s) can include, for example, one or more prompts (e.g., textual data of "in an proactive style") utilized by the LLM in generating the NL based response 758B2, one or more tokens (e.g., a "proactive" token) utilized by the LLM in generating the NL based response 758B2, and/or other information to force the LLM to reflect the "proactive" response style in generating the NL based response 758B2 such as the calendar information being provided (e.g., with respect to the "music festival") without being explicitly requested by the user of the client device 710.

Although FIGS. 7A and 7B are described with respect to the ongoing dialog being a spoken dialog, it should be understood that is for the sake of example and is not meant to be limiting. For example, the ongoing dialog can alternatively be a textual dialog where the user of the client device 710 provides the NL based input via the text entry box 784. Further, although FIGS. 7A and 7B are described with respect to using certain style signals (e.g., prosodic properties), it should be understood that is also for the sake and is not meant to be limiting. For example, the automated assistant can additionally, or alternatively, consider a sentiment of the user in providing the NL based inputs (e.g., that "oh, okay" in the NL based input 756B1 indicates that the user has a sad sentiment), a conversation history between the user of the client device 710 and the automated assistant (e.g., to indicate that the user prefers the "direct" NL based style in FIG. 7A), and/or any other style signal described herein. Moreover, although FIGS. 7A and 7B are described with respect to the automated assistant using certain NL based response styles, it should be understood that those certain response styles are described for the sake of example to illustrate techniques contemplated herein and not meant to be limiting. Additionally, although FIGS. 7A and 7B are described with respect to the automated assistant using only one NL based response style per each turn of the ongoing dialogs depicted, it should be understood that is for the sake of simplicity and is not meant to be limiting. For example, multiple NL based responses can be combined for a given turn of the ongoing dialogs depicted. For instance, in generating the additional NL based response 758A2 of "Welcome" in FIG. 7A, the automated assistant can cause the LLM to continue using the "direct" NL based response style and also cause the LLM to use a "terse" NL based response style, thereby resulting in the additional NL based response 758A2 that only includes a single word.

Figure 8:
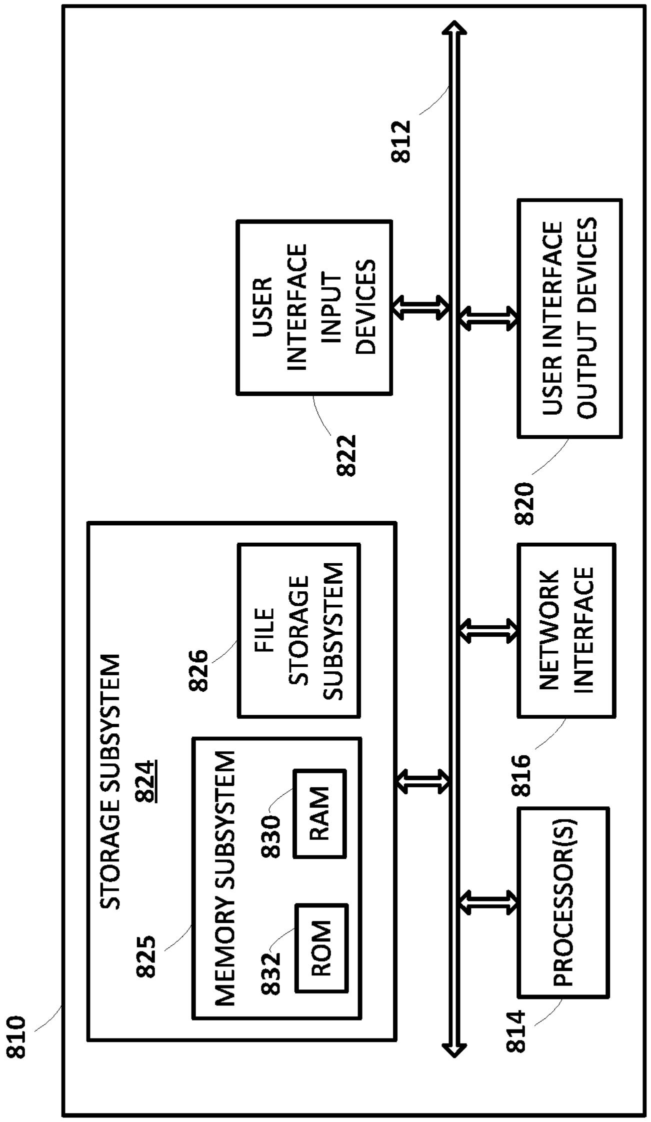
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIGS. 1 and 2.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes, as part of an ongoing dialog between a user of a client device and an automated assistant that is accessible at the client device: receiving natural language (NL) based input from the user of the client device during a given dialog turn of the ongoing dialog between the user of the client device and the automated assistant; obtaining one or more style signals for the given dialog turn of the ongoing dialog between the user of the client device and the automated assistant; processing, using a large language model (LLM) behavior controller, the one or more style signals to determine a given NL based response style, from among a plurality of disparate NL based response styles, that is not specified by the NL based input but is to be utilized in responding to the NL based input; processing, using a LLM, the NL based input and a given NL based response style tag that is associated with the given NL based response style to generate LLM output; determining, based on the LLM output, a NL based response that is in the given NL based response style and that is responsive to the NL based input; and causing the NL based response to be rendered at the client device. By using the behavior controller, techniques can effectively control response styles of the automated assistant that leverages the LLM. In many instances, this guides the human-to-computer dialog between the user and the automated assistant. As a result, the ongoing dialog can be concluded in a quick and efficient manner and/or reduce a quantity of user inputs received during the ongoing dialog.

These and other implementations of technology disclosed herein can optionally include one or more of the following features.

In some implementations, the ongoing dialog between the user of the client device and the automated assistant can be a spoken dialog between the user of the client device and the automated assistant, the NL based input received from the user of the client device can be a spoken utterance, and the one or more style signals can include one or more of: one or more prosodic properties of the user determined based on processing the spoken utterance, a sentiment of the user determined based on processing the spoken utterance, or a conversation history between the user of the client device and the automated assistant.

In some implementations, the ongoing dialog between the user of the client device and the automated assistant can be a textual dialog between the user of the client device and the automated assistant, the NL based input received from the user of the client device can be a typed input, and the one or more style signals can include one or more of: a relative typing speed of the user in providing the typed input, a sentiment of the user determined based on processing the typed input, or a conversation history between the user of the client device and the automated assistant.

In some implementations, processing the one or more style signals to determine the given NL based response style using the LLM behavior controller can include accessing a previously learned mapping that maps the one or more style signals obtained for the given dialog turn of the ongoing dialog between the user of the client device and the automated assistant to the given NL based response style.

In some implementations, the plurality of disparate response styles can include one or more of: a dominant response style, a submissive response style, an inquisitive response style, a proactive response style, an engaging response style, a terse response style, a polite response style, or a direct response style.

In some implementations, the method can further include, prior to processing the NL based input and the given NL based response style tag that is associated with the given NL based response style to generate the LLM output using the LLM: obtaining the given NL based response style tag that is associated with the given NL based response style; and pre-pending the given NL based response style tag to the NL based input.

In some implementations, the method can further include, prior to processing the NL based input and the given NL based response style tag that is associated with the given NL based response style to generate the LLM output using the LLM: obtaining the given NL based response style tag that is associated with the given NL based response style; and post-pending the given NL based response style tag to the NL based input.

In some implementations, the method can further include, prior to processing the NL based input and the given NL based response style tag that is associated with the given NL based response style to generate the LLM output using the LLM: obtaining the given NL based response style tag that is associated with the given NL based response style; pre-pending the given NL based response style tag to the NL based input; and post-pending the given NL based response style tag to the NL based input.

In some implementations, the method can further include: obtaining one or more contextual signals associated with one or more of: the ongoing dialog between the user of the user client device and the automated assistant, the user of the client device, or the client device; determining, based on the one or more contextual signals, a current context; and processing, using the LLM, and along with the NL based input and the given NL based response style tag that is associated with the given NL based response style, the current context to generate the LLM output. In some versions of those implementations, the one or more contextual signals can be distinct from the one or more style signals.

In some implementations, the method can further include: obtaining one or more contextual signals associated with one or more of: the user of the client device, or the client device; and processing, using the LLM, and along with the NL based input and the given NL based response style tag that is associated with the given NL based response style, the one or more contextual signals to generate the LLM output.

In some implementations, the method can further include, as part of the ongoing dialog between the user of the client device and the automated assistant that is accessible at the client device: receiving additional NL based input from the user of the client device during a given additional dialog turn of the ongoing dialog between the user of the client device and the automated assistant; obtaining one or more additional style signals for the additional given dialog turn of the ongoing dialog between the user of the client device and the automated assistant; processing, using the LLM behavior controller, the one or more additional style signals to determine a given additional NL based response style, from among the plurality of disparate NL based response styles, that is not specified by the additional NL based input but is to be utilized in responding to the additional NL based; processing, using the LLM, the additional NL based input and a given additional response style tag that is associated with the given additional response style to generate additional LLM output; determining, based on the additional LLM output, an additional NL based response that is in the given additional response style and that is responsive to the additional NL based input; and causing the additional NL based response to be rendered at the client device.

In some implementations, causing the NL based response to be rendered at the client device can include causing the NL based response to be visually rendered at the client device via a display of the client device and/or can include causing the NL based response to be audibly rendered at the client device via one or more speakers of the client device.

In some implementations, the LLM output can include a probability distribution over a sequence of words or phrases, and determining the NL based response that is in the given NL based response style and that is responsive to the NL based input based on the LLM output can include biasing, based on the given NL based response style, selection of one or more words or phrases for inclusion in the NL based response.

In some versions of those implementations, biasing selection of the one or more words or phrases for inclusion in the NL based response based on the given NL based response style can include selecting, for inclusion in the NL based response, the one or more words or phrases that semantically reflect the given NL based response style.

In additional or alternative versions of those implementations, causing the NL based response to be rendered at the client device can include causing the NL based response to be audibly rendered at the client device via one or more speakers of the client device. Causing the NL based response to be audibly rendered at the client device via one or more speakers of the client device can include processing, using a text-to-speech model, and based on one or more given NL based response style prosodic properties that verbally reflect the given NL based response style, the one or more words or phrases selected for inclusion in the NL based response to generate synthesized speech audio data that captures synthesized speech including the one or more words or phrases selected for inclusion in the NL based response.

In some implementations, a method implemented by one or more processors is provided, and includes obtaining a plurality of large language model (LLM) behavior controller training instances for training a LLM behavior controller. A given LLM behavior controller training instance, of the plurality of LLM behavior controller training instances, includes: given training instance input, the given training instance input including a given dialog turn of a given dialog, and given training instance output, the given training instance output including a given natural language (NL) based response style, from among a plurality of disparate NL based response styles, for the given dialog turn. The method further includes training, based on the plurality of LLM behavior controller training instances, the LLM behavior controller; and causing the LLM behavior controller to be subsequently utilized during respective subsequent dialogs between respective users and an LLM to control NL based response styles of the LLM throughout the respective subsequent dialogs.

These and other implementations of technology disclosed herein can optionally include one or more of the following features.

In some implementations, the given dialog for the given training instance input of the given LLM behavior controller training instance is a spoken dialog, and the given dialog turn of the given dialog for the given training instance input of the given LLM behavior controller training instance can capture a spoken utterance of a user.

In some versions of those implementations, training the LLM behavior controller based on the given LLM behavior controller training instance can include: processing the spoken utterance to determine one or more prosodic properties of the user in providing the spoken utterance and/or a sentiment of the user in providing the spoken utterance; and generating a mapping between the one or more prosodic properties of the user in providing the spoken utterance and/or the sentiment of the user in providing the spoken utterance, and the given NL based response style for the given training instance output of the given LLM behavior controller training instance.

In some implementations, the given dialog for the given training instance input of the given LLM behavior controller training instance can be a textual dialog, and the given dialog turn of the given dialog for the given training instance input of the given LLM behavior controller training instance can capture a typed input of a user.

In some versions of those implementations, training the LLM behavior controller based on the given LLM behavior controller training instance can include: processing the typed input to determine a relative typing speed of the user in providing the typed input and/or a sentiment of the user in providing the typed input; and generating a mapping between the relative typing speed of the user in providing the typed input and/or the sentiment of the user in providing the typed input, and the given NL based response style for the given training instance output of the given LLM behavior controller training instance.

In some implementations, each of the plurality of LLM behavior controller training instances can include corresponding training instance output associated with a corresponding one of the plurality of disparate NL based response styles.

In some implementations, a method implemented by one or more processors is provided, and includes, as part of an ongoing dialog between a user of a client device and an automated assistant that is accessible at the client device: receiving natural language (NL) based input from the user of the client device during a given dialog turn of the ongoing dialog between the user of the client device and the automated assistant; obtaining one or more style signals for the given dialog turn of the ongoing dialog between the user of the client device and the automated assistant; and determining, using a large language model (LLM), and based on the one or more style signals, a given NL based response style, from among a plurality of disparate NL based response styles, that is not specified by the NL based input but is to be utilized in responding to the NL based input. The LLM being previously fine-tuned with respect to the plurality of disparate NL based response styles prior to the ongoing dialog between the user of a client device and the automated assistant that is accessible at the client device. The method further includes, as part of the ongoing dialog between the user and the automated assistant: processing, using the LLM, the NL based input and a given NL based response style tag that is associated with the given NL based response style to generate LLM output; determining, based on the LLM output, a NL based response that is in the given NL based response style and that is responsive to the NL based input; and causing the NL based response to be rendered at the client device. By fine-tuning the LLM as described herein, techniques can effectively control response styles of the automated assistant that leverages the LLM. In many instances, this guides the human-to-computer dialog between the user and the automated assistant. As a result, the ongoing dialog can be concluded in a quick and efficient manner and/or reduce a quantity of user inputs received during the ongoing dialog.

These and other implementations of technology disclosed herein can optionally include one or more of the following features.

In some implementations, the ongoing dialog between the user of the client device and the automated assistant can include a spoken dialog between the user of the client device and the automated assistant, the NL based input received from the user of the client device can be a spoken utterance, and the one or more style signals can include one or more of: one or more prosodic properties of the user determined based on processing the spoken utterance, a sentiment of the user determined based on processing the spoken utterance, or a conversation history between the user of the client device and the automated assistant.

In some versions of those implementations, determining the given NL based response style that is not specified by the NL based input but is to be utilized in responding to the NL based input based on the one or more style signals and using the LLM can include: processing, using the LLM, one or more of: the one or more prosodic properties of the user determined based on processing the spoken utterance, the sentiment of the user determined based on processing the spoken utterance, or the conversation history between the user of the client device and the automated assistant, to predict the given NL based response style.

In some implementations, the ongoing dialog between the user of the client device and the automated assistant can be a textual dialog between the user of the client device and the automated assistant, the NL based input received from the user of the client device can be a typed input, and the one or more style signals can include one or more of: a relative typing speed of the user in providing the typed input, a sentiment of the user determined based on processing the typed input, or a conversation history between the user of the client device and the automated assistant.

In some versions of those implementations, determining the given NL based response style that is not specified by the NL based input but is to be utilized in responding to the NL based input based on the one or more style signals can include processing, using the LLM, one or more of: the relative typing speed of the user in providing the typed input, the sentiment of the user determined based on processing the typed input, or the conversation history between the user of the client device and the automated assistant, to predict the given NL based response style.

In some implementations, a method implemented by one or more processors is provided, and includes obtaining a plurality of training instances for fine-tuning a large language model (LLM). A given training instance, of the plurality of training instances, can include: given training instance input, the given training instance input including a given dialog turn of a given dialog, and given training instance output, the given training instance output including a given natural language (NL) based response style, from among a plurality of disparate NL based response styles, for the given dialog turn. The method further includes fine-tuning, based on the plurality of training instances, the LLM to generate a fine-tune LLM that is fine-tuned with respect to predicting the plurality of disparate NL based response styles; and causing the fine-tuned LLM to be subsequently utilized during respective subsequent dialogs between respective users and the fine-tuned LLM to control NL based response styles of the fine-tuned LLM throughout the respective subsequent dialogs.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

as part of an ongoing spoken dialog between a user of a client device and an automated assistant that is accessible at the client device:

receiving spoken natural language (NL) based input from the user of the client device during a given dialog turn of the ongoing spoken dialog between the user of the client device and the automated assistant;

determining, based on a first set of prosodic properties of the spoken NL based input, one or more style signals that are specific to the given dialog turn of the ongoing spoken dialog between the user of the client device and the automated assistant;

processing, using a large language model (LLM) behavior controller, the one or more style signals to determine a given NL based response style, from among a plurality of disparate NL based response styles, that is not specified by the spoken NL based input but is to be utilized in responding to the spoken NL based input;

processing, using a LLM, the spoken NL based input and a given NL based response style tag that is associated with the given NL based response style to generate LLM output, wherein the LLM output comprises a probability distribution over a sequence of words or phrases;

determining, based on the LLM output, an audible NL based response that is in the given NL based response style and that is responsive to the spoken NL based input, wherein determining the audible NL based response that is in the given NL based response style and that is responsive to the spoken NL based input based on the LLM output comprises:

biasing, based on the given NL based response style, selection of one or more of the words or phrases, from the LLM output, for inclusion in the audible NL based response; and causing the audible NL based response to be rendered at the client device, wherein the audible NL based response is synthesized using a second set of prosodic properties that are associated with the given NL based response style, and wherein the given NL based response style is dynamically adapted between two or more of the plurality of disparate NL based response styles throughout the ongoing spoken dialog.

2. The method of claim 1, wherein the spoken NL based input received from the user of the client device is a spoken utterance, and wherein the first set of prosodic properties is determined based on processing the spoken utterance.

3. The method of claim 1, wherein processing the one or more style signals to determine the given NL based response style using the LLM behavior controller comprises:

accessing a previously learned mapping that maps the one or more style signals obtained for the given dialog turn of the ongoing spoken dialog between the user of the client device and the automated assistant to the given NL based response style.

4. The method of claim 1, wherein the plurality of disparate response styles comprise one or more of: a dominant response style, a submissive response style, an inquisitive response style, a proactive response style, an engaging response style, a terse response style, a polite response style, or a direct response style.

5. The method of claim 1, further comprising:

prior to processing the spoken NL based input and the given NL based response style tag that is associated with the given NL based response style to generate the LLM output using the LLM:

obtaining the given NL based response style tag that is associated with the given NL based response style; and pre-pending the given NL based response style tag to the spoken NL based input.

6. The method of claim 1, further comprising:

prior to processing the spoken NL based input and the given NL based response style tag that is associated with the given NL based response style to generate the LLM output using the LLM:

obtaining the given NL based response style tag that is associated with the given NL based response style; and post-pending the given NL based response style tag to the spoken NL based input.

7. The method of claim 1, further comprising:
prior to processing the spoken NL based input and the given NL based response style tag that is associated with the given NL based response style to generate the LLM output using the LLM:
obtaining the given NL based response style tag that is associated with the given NL based response style;
pre-pending the given NL based response style tag to the spoken NL based input; and
post-pending the given NL based response style tag to the spoken NL based input.

8. The method of claim 1, further comprising:
obtaining one or more contextual signals associated with one or more of: the ongoing spoken dialog between the user of the user client device and the automated assistant, the user of the client device, or the client device;
determining, based on the one or more contextual signals, a current context; and
processing, using the LLM, and along with the spoken NL based input and the given NL based response style tag that is associated with the given NL based response style, the current context to generate the LLM output.

9. The method of claim 8, wherein the one or more contextual signals are distinct from the one or more style signals.

10. The method of claim 1, further comprising:
obtaining one or more contextual signals associated with one or more of: the user of the client device, or the client device; and
processing, using the LLM, and along with the spoken NL based input and the given NL based response style tag that is associated with the given NL based response style, the one or more contextual signals to generate the LLM output.

11. The method of claim 1, further comprising:
as part of the ongoing spoken dialog between the user of the client device and the automated assistant that is accessible at the client device:
receiving additional spoken NL based input from the user of the client device during a given additional dialog turn of the ongoing spoken dialog between the user of the client device and the automated assistant;
determining, based on a third set of prosodic properties of the additional spoken NL based input, one or more additional style signals that are specific to the additional given dialog turn of the ongoing spoken dialog between the user of the client device and the automated assistant;
processing, using the LLM behavior controller, the one or more additional style signals to determine a given additional NL based response style, from among the plurality of disparate NL based response styles, that is not specified by the additional spoken NL based input but is to be utilized in responding to the additional spoken NL based input;
processing, using the LLM, the additional spoken NL based input and a given additional response style tag that is associated with the given additional response style to generate additional LLM output;
determining, based on the additional LLM output, an additional audible NL based response that is in the given additional response style and that is responsive to the additional spoken NL based input; and
causing the additional audible NL based response to be rendered at the client device.

12. The method of claim 1, wherein causing the audible NL based response to be rendered at the client device comprises causing the audible NL based response to be audibly rendered at the client device via one or more speakers of the client device.

13. The method of claim 1, wherein biasing selection of the one or more words or phrases for inclusion in the audible NL based response based on the given NL based response style comprises:
selecting, for inclusion in the audible NL based response, one or more of the words or phrases that semantically reflect the given NL based response style.

14. The method of claim 13, wherein causing the audible NL based response to be rendered at the client device comprises causing the audible NL based response to be audibly rendered at the client device via one or more speakers of the client device, and wherein causing the audible NL based response to be audibly rendered at the client device via one or more speakers of the client device comprises:
processing, using a text-to-speech model, and based on the second set of prosodic properties, one or more of the words or phrases selected for inclusion in the audible NL based response to generate synthesized speech audio data that includes one or more of the words or phrases selected for inclusion in the audible NL based response.

15. A method implemented by one or more processors, the method comprising:
as part of an ongoing spoken dialog between a user of a client device and an automated assistant that is accessible at the client device:
receiving spoken natural language (NL) based input from the user of the client device during a given dialog turn of the ongoing spoken dialog between the user of the client device and the automated assistant;
determining, based on a first set of prosodic properties of the spoken NL based input, one or more style signals that are specific to the given dialog turn of the ongoing spoken dialog between the user of the client device and the automated assistant;
determining, using a large language model (LLM), and based on the one or more style signals, a given NL based response style, from among a plurality of disparate NL based response styles, that is not specified by the spoken NL based input but is to be utilized in responding to the spoken NL based input, wherein the LLM was previously fine-tuned with respect to the plurality of disparate NL based response styles prior to the ongoing spoken dialog between the user of a client device and the automated assistant that is accessible at the client device;
processing, using the LLM, the spoken NL based input and a given NL based response style tag that is associated with the given NL based response style to generate LLM output, wherein the LLM output comprises a probability distribution over a sequence of words or phrases;
determining, based on the LLM output, an audible NL based response that is in the given NL based response style and that is responsive to the spoken NL based input, wherein determining the audible NL based response that is in the given NL based response style and that is responsive to the spoken NL based input based on the LLM output comprises:
biasing, based on the given NL based response style, selection of one or more of the words or phrases, from the LLM output, for inclusion in the audible NL based response; and causing the audible NL based response to be rendered at the client device, wherein the audible NL based response is synthesized using a second set of prosodic properties that are associated with the given NL based response style, and wherein the given NL based response style is dynamically adapted between two or more of the plurality of disparate NL based response styles throughout the ongoing spoken dialog.

16. A system comprising:

at least one processor; and memory storing instructions that, when executed by the at least one processor, cause the at least one processor to be operable to:

as part of an ongoing spoken dialog between a user of a client device and an automated assistant that is accessible at the client device:

receive spoken natural language (NL) based input from the user of the client device during a given dialog turn of the ongoing spoken dialog between the user of the client device and the automated assistant;

determine, based on a first set of prosodic properties of the spoken NL based input, one or more style signals that are specific to the given dialog turn of the ongoing dialog between the user of the client device and the automated assistant;

process, using a large language model (LLM) behavior controller, the one or more style signals to determine a given NL based response style, from among a plurality of disparate NL based response styles, that is not specified by the spoken NL based input but is to be utilized in responding to the spoken NL based input;

process, using the LLM, the spoken NL based input and a given NL based response style tag that is associated with the given NL based response style to generate LLM output, wherein the LLM output comprises a probability distribution over a sequence of words or phrases;

determine, based on the LLM output, an audible NL based response that is in the given NL based response style and that is responsive to the spoken NL based input, wherein the instructions to determine the audible NL based response that is in the given NL based response style and that is responsive to the spoken NL based input based on the LLM output comprise instructions to:

bias, based on the given NL based response style, selection of one or more of the words or phrases, from the LLM output, for inclusion in the audible NL based response; and cause the audible NL based response to be rendered at the client device, wherein the audible NL based response is synthesized using a second set of prosodic properties that are associated with the given NL based response style, and wherein the given NL based response style is dynamically adapted between two or more of the plurality of disparate NL based response styles throughout the ongoing spoken dialog.

17. The system of claim 16, wherein the spoken NL based input received from the user of the client device is a spoken utterance, and wherein the first set of prosodic properties is determined based on processing the spoken utterance.

* * * * *